(12) United States Patent  
Agarwal et al.

(10) Patent No.: US 10,436,615 B2
(45) Date of Patent: Oct. 8, 2019

(54) VIRTUAL SENSOR SYSTEM

(71) Applicant: Carnegie Mellon University, Pittsburgh, PA (US)

(72) Inventors: Yuvraj Agarwal, Pittsburgh, PA (US); Christopher Harrison, Pittsburgh, PA (US); Gierad Laput, Pittsburgh, PA (US); Sudershan Boovaraghavan, Pittsburgh, PA (US); Chen Chen, Pittsburgh, PA (US); Abhijit Hota, Pittsburgh, PA (US); Bo Robert Xiao, Pittsburgh, PA (US); Yang Zhang, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 15/961,537

(22) Filed: Apr. 24, 2018

(65) Prior Publication Data

US 2018/0306609 A1 Oct. 25, 2018

Related U.S. Application Data

(60) Provisional application No. 62/602,487, filed on Apr. 24, 2017, provisional application No. 62/602,543, (Continued)

(51) Int. Cl.
*H03F 1/26* (2006.01)
*G01D 9/00* (2006.01)
(Continued)

(52) U.S. Cl.
CPC ............... *G01D 9/005* (2013.01); *G01D 5/00* (2013.01); *G06N 20/00* (2019.01); *H04L 67/12* (2013.01); *H04W 4/38* (2018.02); *H04L 12/2823* (2013.01)

(58) Field of Classification Search
CPC ......... G01D 9/005; G01D 5/00; G06N 99/005
(Continued)

(56) References Cited

U.S. PATENT DOCUMENTS 5,502,773 A  3/1996 Tibbetts et al.
6,408,227 B1 * 6/2002 Singhvi ................... C02F 1/008
                                                    700/266

(Continued)

FOREIGN PATENT DOCUMENTS

WO  WO 2016/200887 A1  12/2016
WO  WO 2017/123130 A1   7/2017
(Continued)

OTHER PUBLICATIONS

International Search Report and Written Opinion for PCT/US2018/029165, dated Jul. 10, 2018 (17 pages).

*Primary Examiner* — Sujoy K Kundu
*Assistant Examiner* — Xiuqin Sun
(74) *Attorney, Agent, or Firm* — K&L Gates LLP

(57) ABSTRACT

A sensing system includes a sensor assembly that is communicably connected to a computer system, such as a server or a cloud computing system. The sensor assembly includes a plurality of sensors that sense a variety of different physical phenomena. The sensor assembly featurizes the raw sensor data and transmits the featurized data to the computer system. Through machine learning, the computer system then trains a classifier to serve as a virtual sensor for an event that is correlated to the data from one or more sensor streams within the featurized sensor data. The virtual sensor can then subscribe to the relevant sensor feeds from the sensor assembly and monitor for subsequent occurrences of the event. Higher order virtual sensors can receive the (Continued)

outputs from lower order virtual sensors to infer nonbinary details about the environment in which the sensor assemblies are located.

30 Claims, 20 Drawing Sheets

Related U.S. Application Data filed on Apr. 27, 2017, provisional application No. 62/605,675, filed on Aug. 22, 2017.

(51) Int. Cl.
*G01D 5/00* (2006.01)
*G06N 20/00* (2019.01)
*H04L 29/08* (2006.01)
*H04W 4/38* (2018.01)
*H04L 12/28* (2006.01)

(58) Field of Classification Search
USPC .......................................................... 702/189
See application file for complete search history.

(56) References Cited

U.S. PATENT DOCUMENTS

| | | | |
|---|---|---|---|
| 7,827,131 | B2 | 11/2010 | Nugent |
| 9,224,096 | B2 | 12/2015 | Oppenheimer |
| 9,786,145 | B2 | 10/2017 | Oppenheimer |
| 10,007,513 | B2 * | 6/2018 | Malladi .................... G06F 8/70 |
| 2005/0261803 | A1 | 11/2005 | Seth et al. |
| 2008/0318684 | A1 | 12/2008 | Rofougaran |
| 2009/0055126 | A1 | 2/2009 | Yanovich et al. |
| 2009/0125517 | A1 | 5/2009 | Krishnaswamy et al. |
| 2011/0167024 | A1 | 7/2011 | Maldonado Diaz et al. |
| 2013/0063550 | A1 | 3/2013 | Ritchey et al. |
| 2014/0129560 | A1 | 5/2014 | Grokop et al. |
| 2014/0200855 | A1 | 7/2014 | Oonk et al. |
| 2014/0279733 | A1 | 9/2014 | Djugash |
| 2014/0342343 | A1 | 11/2014 | Kapoor et al. |
| 2015/0046841 | A1 | 2/2015 | Sharon et al. |
| 2015/0324692 | A1 | 11/2015 | Ritchey et al. |
| 2016/0071549 | A1 | 3/2016 | von Sneidern et al. |
| 2016/0080835 | A1 | 3/2016 | von Sneidern et al. |
| 2016/0162082 | A1 | 6/2016 | Schwesinger et al. |
| 2016/0170603 | A1 | 6/2016 | Bastien et al. |
| 2016/0188207 | A1 | 6/2016 | Choi et al. |
| 2016/0247043 | A1 | 8/2016 | Rieutort-Louis et al. |
| 2016/0336006 | A1 | 11/2016 | Levit et al. |
| 2016/0350649 | A1 | 12/2016 | Zhang et al. |
| 2017/0060574 | A1 | 3/2017 | Malladi et al. |
| 2017/0169358 | A1 | 6/2017 | Choi et al. |
| 2017/0206721 | A1 | 7/2017 | Koo |
| 2017/0270912 | A1 | 9/2017 | Levit et al. |
| 2017/0293808 | A1 * | 10/2017 | Jain .................... G06K 9/00791 |
| 2018/0031618 | A1 | 2/2018 | Friedlander et al. |
| 2018/0082224 | A1 | 3/2018 | Leslie et al. |

FOREIGN PATENT DOCUMENTS

| | | |
|---|---|---|
| WO | WO 2017/171266 A1 | 10/2017 |
| WO | WO 2017/171826 A1 | 10/2017 |

* cited by examiner

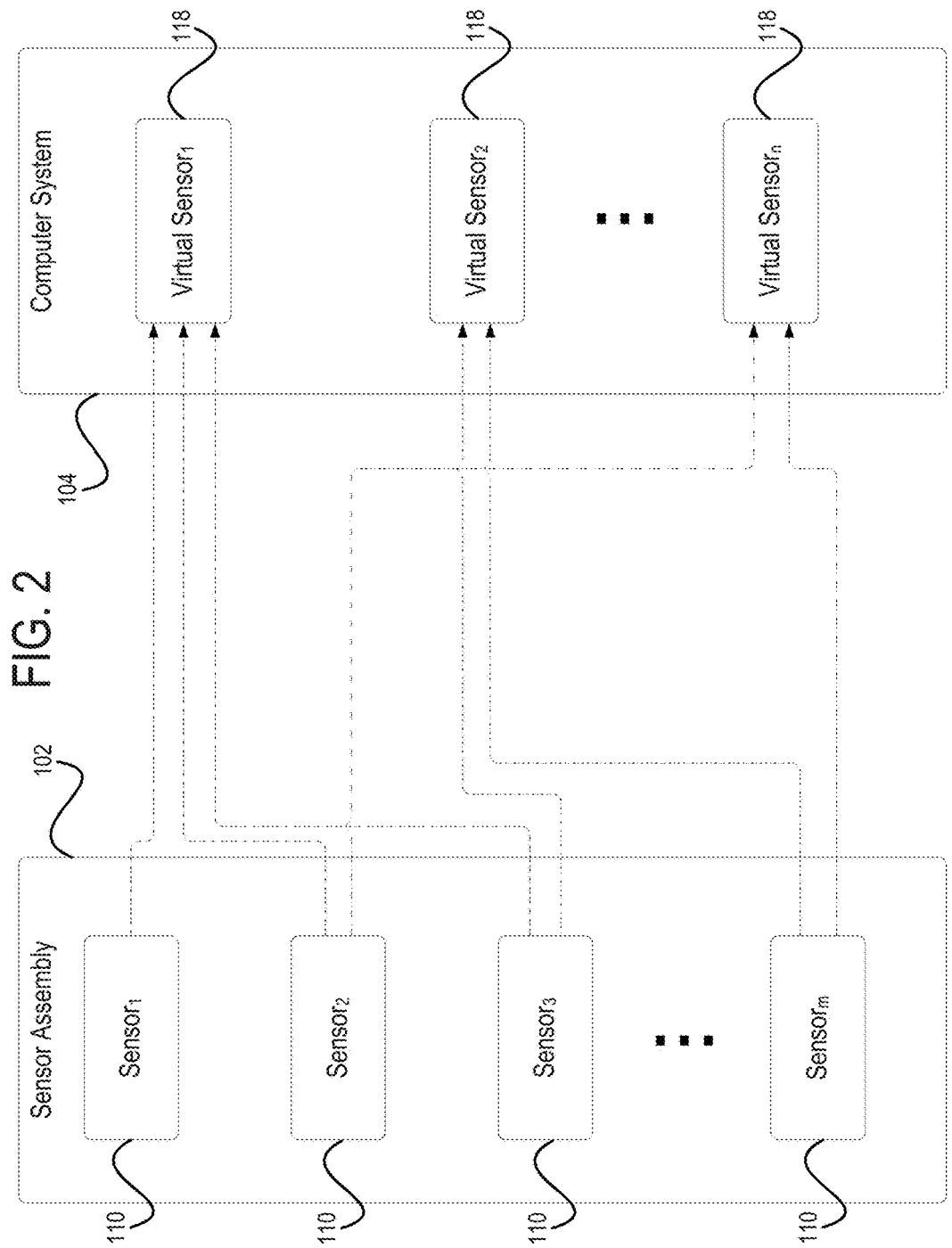

VIRTUAL SENSOR SYSTEM

CROSS REFERENCE TO RELATED APPLICATIONS

This application claims the benefit of priority under 35 U.S.C. § 119(e) to U.S. Provisional Patent Application No. 62/602,487, titled SYNTHETIC SENSORS, filed Apr. 24, 2017; U.S. Provisional Patent Application No. 62/602,543, titled GENERAL PURPOSE SYNTHETIC SENSOR SYSTEM, filed Apr. 27, 2017; and U.S. Provisional Patent Application No. 62/605,675, titled SECURE UBIQUITOUS SENSING SYSTEM, filed Aug. 22, 2017; the disclosure for each of which is hereby incorporated by reference in its entirety.

GOVERNMENT LICENSE RIGHTS

This invention was made with government support under grant CNS1526237 awarded by the National Science Foundation. The government has certain rights in the invention.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

The promise of smart environments (e.g., the "smart home") and the Internet of Things (IoT) relies on robust sensing of diverse environmental facets. Traditional approaches rely on measuring one particular aspect of an environment with special-purpose sensors. Regardless of the approach taken, the goal remains the same: to apply sensing and computation to enhance the human experience, especially as it pertains to physical contexts (e.g., home, office, workshop) and the amenities contained within. Numerous approaches have been attempted and articulated, though none have reached widespread use to date.

One option is for users to upgrade their environments with newly released "smart" devices (e.g., light switches, kitchen appliances), many of which contain sensing functionality. However, this sensing is generally limited to the appliance itself (e.g., a smart light sensing whether it is on or off) or single parameter associated with its core function (e.g., a smart thermostat sensing whether the room is occupied). Likewise, few smart devices are interoperable, forming silos of sensed data that thwart a holistic experience. Instead of achieving a smart home, the best one can currently hope for are small islands of smartness. This approach also carries a significant upgrade cost, which so far has proven unpopular with consumers, who generally upgrade appliances in a piecemeal manner.

A variety of different sensing modalities have been described in the context of environmental sensing, including special-purpose sensing systems, distributed sensing systems, infrastructure-mediated sensing systems, and general-purpose sensing systems. These sensing modalities can be organized according to the number of sensors that they utilize and the number of facets or parameters that they sense. In particular, special-purpose sensing systems utilize a single sensor, infrastructure-mediated and general-purpose sensing systems utilize one or a few sensors, and distributed sensing systems utilize many sensors. Further, special-purpose sensing systems sense a single facet, infrastructure-mediated sensing systems tend to sense one or a few facets, general-purpose sensing systems tend to sense many facets, and distributed sensing systems can sense anywhere from a single facet to many facets of an environment.

However, currently existing sensing systems typically transfer all the sensed data to a backend server for processing and/or storage system leading to problems relating to, for example, bandwidth usage and processing speed.

SUMMARY

In one general aspect, the present invention is directed to a ubiquitous sensing system utilizing one or more sensors that are capable of directly or indirectly detecting events in the environment surrounding the sensor assembly. While the sensing system is configured for indirect sensing, such that each and every object and/or person in the environment need not be instrumented in a location in order to sense their state or events associated with them, the sensors may also be coupled to objects and/or humans for direct sensing without any modifications. The sensing system includes a sensor assembly that can be positioned within an environment or location and that is capable of communicating with a server or other type of computer system for processing. The sensing system may optionally process sensor data locally and transmit the processed data to the server. The server utilizes machine learning to characterize received sensor data and/or training data in association with an event or events to learn to detect the occurrence of the designated event(s). In one aspect, the user can annotate the sensor data stream to indicate when certain events occurred and the machine learning algorithm then learns what characteristics of the data stream correlate to the event, allowing the sensing system to then detect future occurrences of the event. In another aspect, the sensing system utilizes deep machine learning to determine when events have occurred and what characteristics of the sensor data stream correlate to those events. In yet another aspect, the server can have a library of previously trained machine learning models and/or may train machine learning models from prior data collection steps, crowd sourcing, or the like, for different activities and events, and the sensing system can directly send sensor data and have the server determine what events have occurred. The server thus can define a set of machine learning-trained "virtual sensors" that are each capable of detecting events from combinations of sensor data that are correlated with the occurrences of the events, but that are not necessarily provided by sensors that are directly affixed or otherwise associated with the object(s) being sensed. More specifically, these types of virtual sensors can be referred to as "first order" virtual sensors. The server can further implement higher order virtual sensors that are capable of detecting events or conditions from a combination of data from lower order virtual sensors (e.g., second order virtual sensors detect an event from the output of first order virtual sensors).

In that connection, in one embodiment, the sensing system comprises a sensor assembly with processing and communication capabilities and a back end server system. The sensor assembly comprises a control circuit and one or more sensors. Each of the sensors senses one or more different physical phenomenon in an environment of the sensor assembly. The back end server system, which comprises at least one server, is in communication with the sensor assembly. Further, the control circuit of the sensor assembly is configured to, among other things: (i) extract features from raw sensor data from the plurality of sensors; and (ii)

transmit data packets to the back end server system, wherein the data packets comprise featurized data from the plurality of sensors. The at least one server of the back end server system is configured to implement the first order virtual sensors, where each of the first order virtual sensors is trained through machine learning to detect, based on the featurized data transmitted from the sensor assembly, an event or condition in the environment of the sensor assembly.

In another general embodiment, the back end server system is programmed to receive the featurized sensor data from the sensor assembly; determine an occurrence of an event via the featurized sensor data; train, via machine learning, a virtual sensor implemented by the server to detect the event by characterizing the featurized sensor data for the plurality of sensors that are activated in association with the event; and monitor, via the virtual sensor, for subsequent occurrences of the event.

Thus, various embodiments of the present invention provide a highly capable sensor that can directly or indirectly monitor a large environment. These and other benefits of the present invention will be apparent from the description that follows.

FIGURES

The features of various aspects are set forth with particularity in the appended claims. The various aspects, however, both as to organization and methods of operation, together with further objects and advantages thereof, may best be understood by reference to the following description, taken in conjunction with the accompanying drawings as follows.

FIG. 2 illustrates a block diagram of a sensing system including virtual sensors receiving data from various sensors of the sensor assembly, in accordance with at least one aspect of the present disclosure.

DESCRIPTION

Certain aspects will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting examples aspects and that the scope of the various aspects is defined solely by the claims. The features illustrated or described in connection with one aspect may be combined with the features of other aspects. Such modifications and variations are intended to be included within the scope of the claims. Furthermore, unless otherwise indicated, the terms and expressions employed herein have been chosen for the purpose of describing the illustrative aspects for the convenience of the reader and are not to limit the scope thereof.

Figure 1A:
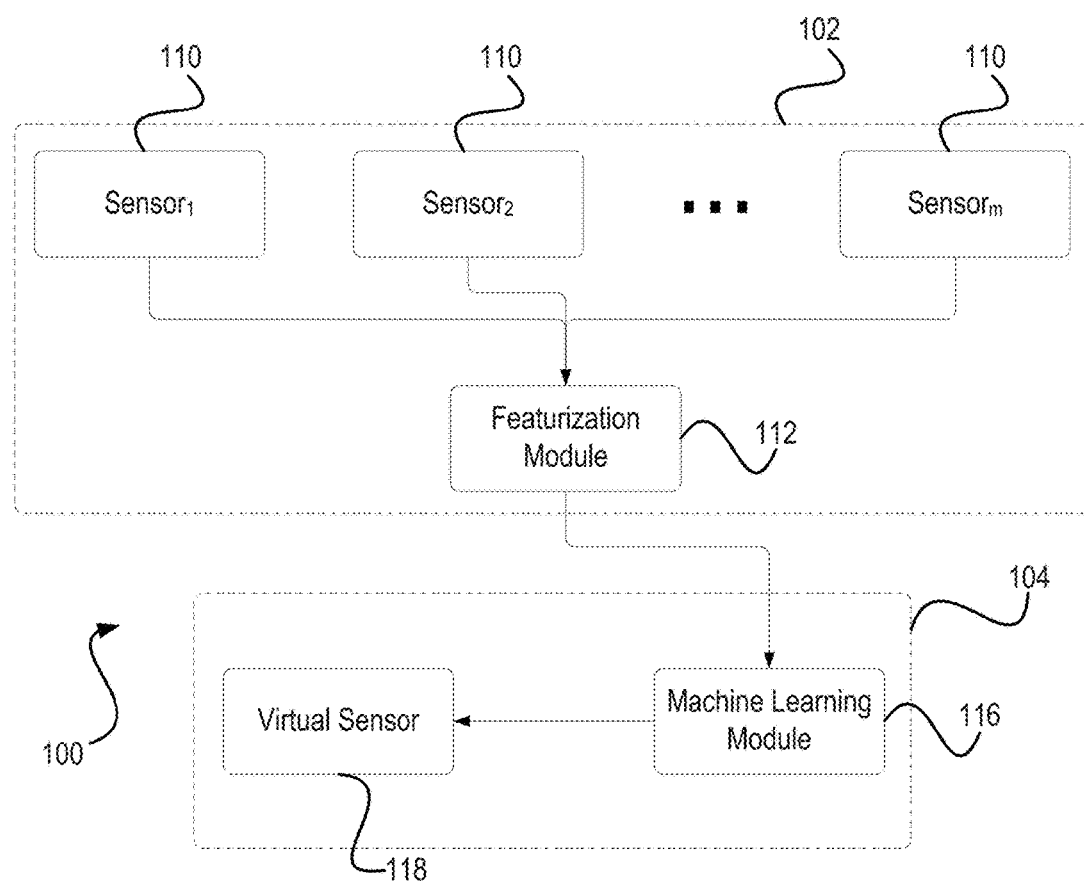
FIG. 1A illustrates a block diagram of a sensing system, in accordance with at least one aspect of the present disclosure.
Figure 5:
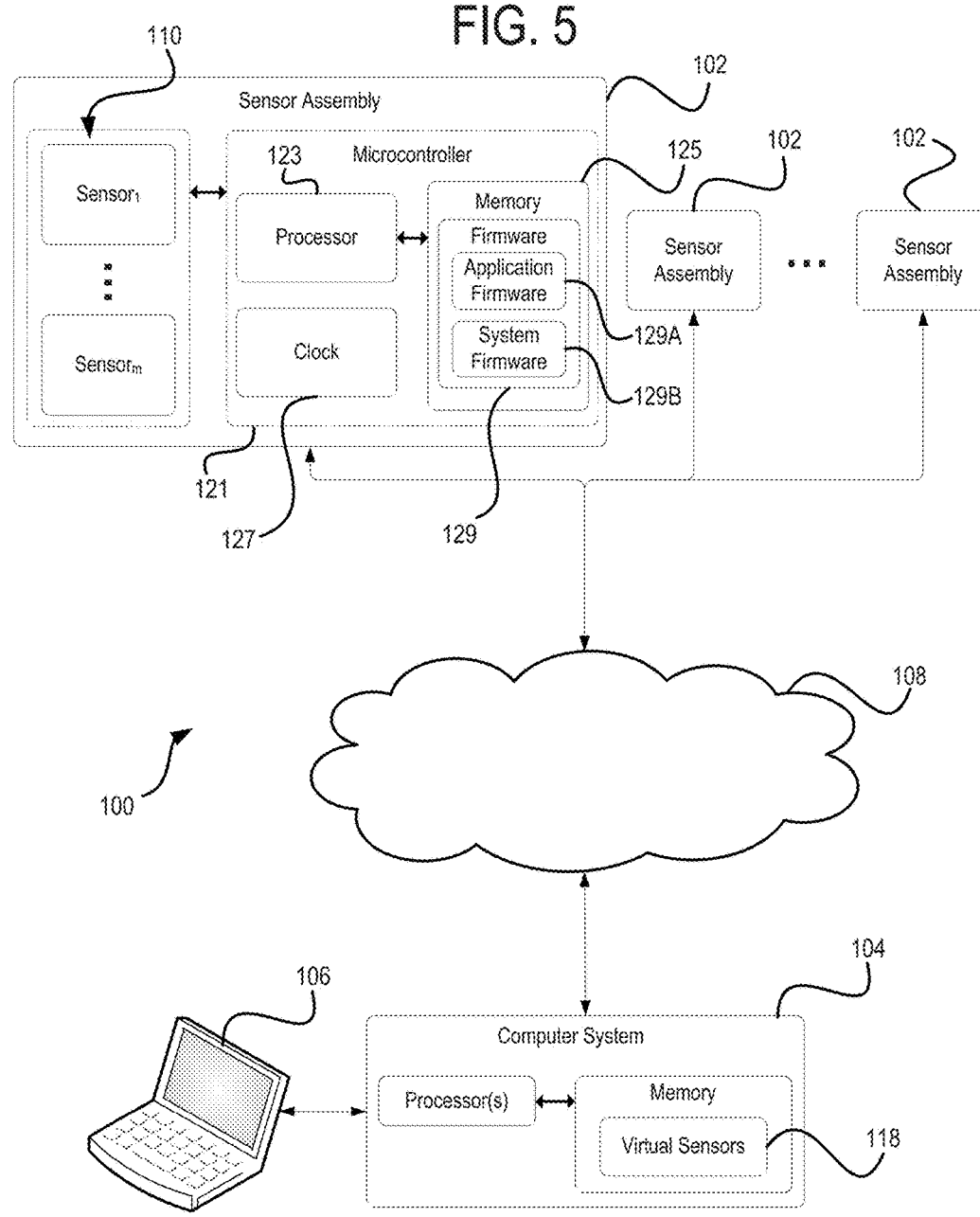
FIG. 5 illustrates a block diagram of a sensing system including multiple sensor assemblies communicably coupled to a computer system, in accordance with at least one aspect of the present disclosure.

FIG. 1A illustrates a block diagram of a sensing system 100, in accordance with at least one aspect of the present disclosure. The sensing system 100 comprises a sensor assembly 102 having one or more sensors 110 and a computer system 104 (e.g., one or a number of networked servers) to which the sensor assembly 102 can be communicably connected via a network 108 (FIG. 5). The sensors 110 include a variety of sensors for detecting various physical or natural phenomena in the vicinity of the sensor assembly 102, such as vibration, sound, ambient temperature, light color, light intensity, electromagnetic interference (EMI), motion, ambient pressure, humidity, composition of gases (e.g., allowing certain types of gases and pollutants to be detected), distance to an object or person, presence of a user device, infrared radiation (e.g., for thermal imaging), or the like. While FIG. 1A illustrates one sensor assembly 102 included in the sensing system 100, a plurality of sensor assemblies communicably connected with each other and/or with a computer system 104 are within the scope of this disclosure (as shown in FIG. 5).

The sensing system 100 is configured to train and implement one or more virtual sensors 118, which are machine learning based classification systems or algorithms trained to detect particular events to which the virtual sensors 118 are assigned as correlated to the data sensed by the sensors 110 of the sensor assembly 102 and/or other virtual sensors 118. The training and implementation of various aspects of the virtual sensors 118 are described in more detail below.

The sensing system 100 may be configured to be, without limitation, a special-purpose sensing system, a distributed sensing system, infrastructure-mediated sensing system, and/or a general-purpose sensing system.

In an aspect, special-purpose sensing systems may include a single sensor assembly 102 configured to monitor a single facet of an environment. For example, a sensor assembly 102 including a microphone can be affixed to a faucet so that water consumption can be inferred (which, in turn, is used to power behavior-changing feedback). As another example, a sensor assembly 102 including a temperature sensor and/or an occupancy sensor can be placed in a room to sense environmental data that can be used by a heating, ventilation, and air conditioning (HVAC) system to manage the HVAC system.

In an aspect, infrastructure-mediated sensing systems may include one or more sensor assemblies 102 installed within a structure at strategic infrastructure probe points. For example, sensor assemblies 102 can be coupled to a building's power lines to detect "events" caused by electrical appliances. Since home electrical lines are shared, a single sensor assembly can observe activities across an entire house. Infrastructure-mediated sensing systems may also be coupled to, e.g., HVAC, plumbing, natural gas lines, and electric lighting. For example, a sensing assembly including one or more sensors may be installed at a probe point, enabling the sensing system to monitor aspects of the building. For example, a plumbing-attached sensor assembly may be configured to detect sink, shower, and toilet use. Infrastructure-mediated sensing systems may include one sensor assembly and/or a plurality of sensor assemblies utilized to monitor a few facts of an environment.

In an aspect, distributed sensing systems may include many sensor assemblies 102 deployed in an environment that are networked together. Such a sensing system may be used to enlarge the sensed area (e.g., occupancy sensing across an entire warehouse) or increase sensing fidelity through complementary readings (e.g., sensing seismic events utilizing sensors deployed across an area). The distributed sensor assemblies 102 can be homogenous (e.g., an array of identical infrared occupancy sensors) and/or heterogeneous. Also, the array can sense one facet (e.g., fire detection) or many facets (e.g., appliance use). For example, a home security system is a heterogeneous distributed system, where one or more sensor assemblies may include door sensors, window sensors, noise sensors, occupancy sensors and even cameras work together to sense a single facet of the environment: "Is there an intruder in the home?" As another example, a homogenous array of sensor assemblies comprising magnetic sensors can be utilized to detect object interactions throughout an entire house. Thus, distributed sensing systems may be configured to include as many sensor assemblies utilized to monitor anywhere between a single facet to many facets of an environment, depending upon the particular implementation of the distributed sensing system.

In an aspect, a general purpose sensing system may include a wide variety of underlying sensor assemblies 102 that can be utilized flexibly such that they can be attached to a variety of objects and can sense many facets without any modification to the sensor assembly 102.

In certain aspects, the sensing system 100 may be a direct sensing system and/or an indirect sensing system. For direct sensing, a sensor assembly 102 is physically coupled to an object or infrastructure of interest and may provide excellent signal quality. Some direct sensing systems may include utilize batteries or other power sources to power the sensor assembly. Indirect sensing systems seek to sense state and events indirectly, without having to physically couple to objects. For example, a sensor assembly including an electromagnetic sensor (EMI sensor) can be installed near an appliance and/or it's power source to detect usage of the appliance because when an appliance is in different modes of operation (e.g., refrigerator compressor running, interior lights on/off), the object and/or the power source emits characteristic electromagnetic noise that can be captured and recognized. As another example, a sensor assembly including an acoustic sensor can be installed in a workshop to recognize tool usage according to the detected acoustic characteristics of each tool. Example sensors to be included in the sensor assembly 102 that are configured for indirect sensing can include, without limitation, noncontact thermometers, rangefinders, motion sensors, EMI sensors, acoustic sensors, vibration sensors, magnetic field sensors, cameras, ultrasonic sensors, laser based sensors (e.g., lidar), or the like. Indirect sensing systems have greater flexibility in sensor placement which allows for sensors to be better integrated into the environment or even hidden. Further, it may be possible to place the sensor assembly of an indirect sensing system at a nearby wall power outlet, eliminating the need for batteries.

Referring back to FIG. 1A, the sensor assembly 102 further includes a featurization module 112 (which can be implemented with firmware executed by a microcontroller(s) or other programmable circuit(s) of the sensor assembly 102) that processes and converts raw data from the sensors 110 into various forms of processed data and extracts measurable properties or characteristics of the data, i.e., features. The featurization module 112 can output the processed raw sensor 110 data in the form of, e.g., a feature vector, to be provided to a machine learning-based classification system, a statistical classification system, and/or a clustering system that utilizes pattern recognition, machine learning techniques (e.g., classifier), logistic regression, decision tree, random forest, or the like, at the computer system 104. In various aspects, the featurization module 112 can ingest data from both high sample rate (e.g., several kHz to several MHz) and low sample rate (e.g., 0.1 Hz to 1 kHz) sensors 110. Examples of high sample rate sensors may include, without limitation, vibration sensors, EMI sensors, microphones, cameras, or the like. Examples of low sample rate sensors may include, without limitation, temperature sensors, humidity sensors, light level sensors, or the like.

The featurization module 112 can determine or extract various features from, for example, the time domain and/or the frequency domain representations (e.g., by transformation of the time domain representations) of the sensor data. The features from the raw data from the sensors 110 can be extracted utilizing a number of different techniques, which can vary according to sample rate at which the sensor data was collected or the particular type of sensors 110. Furthermore, the number and/or types of features extracted from the raw sensor data and/or transmitted to the computer system 104 by the featurization module 112 can be based on, for example, the sample rate, the types of sensors, user input, or the like. In various aspects, the number and/or types of features extracted by the featurization module 112 can be controlled by the featurization module 112 itself, the computer system 104, a client 106 (FIG. 5), and/or another system or device that is part of the sensing system 100 or can access the sensing system 100. In one example, the data from one or more high sample rate sensors of the sensor assembly 102 can be featurized by transforming the data into a spectral representation via a sliding window Fast Fourier Transform (FFT) (e.g., 256 samples, 10% overlapping) at a particular rate (e.g., 10 Hz), with phase information either utilized or discarded. This technique may also be used to featurize data from low sample rate sensors. In another example, the data from a high sample rate acoustic sensor (e.g., a microphone) of the sensor assembly 102 can be transformed into the frequency domain first and then one or more of the mel-frequency cepstral coefficient (MFCC) features (e.g., 14 or 40 MFCC coefficients, on a sliding window of audio data), the delta features, and/or the double delta features can be extracted from the frequency domain. In another example, the data from the low and/or high sample rate sensors 110 can be featurized by calculating various statistical features (e.g., min, max, range, mean, median, mode, sum, standard deviation, and/or centroid) on a rolling buffer with different time granularities (e.g., 100 ms, 500 ms, and/or one second) at a particular rate (e.g., 10 Hz). Also, particularly for high sample rate sensors, the raw sensor data can be featurized by transforming the data into a spectral representation. In one aspect, the featurized data for every sensor can be independently transmitted to the computer system 104 for further processing thereon. In another aspect, the featurized data for a subset of sensors can be packaged together and transmitted to the computer system 104. Also, the back-end server system can transmit a signal or instruction to the sensor assembly to inform the sensor assembly what features should be extracted for a particular sensor. That is, the back-end server system can modify or change when or which features are extracted by the sensor assembly (for embodiments where the sensor assembly is extracting the features in the raw sensor data).

Figure 1B:
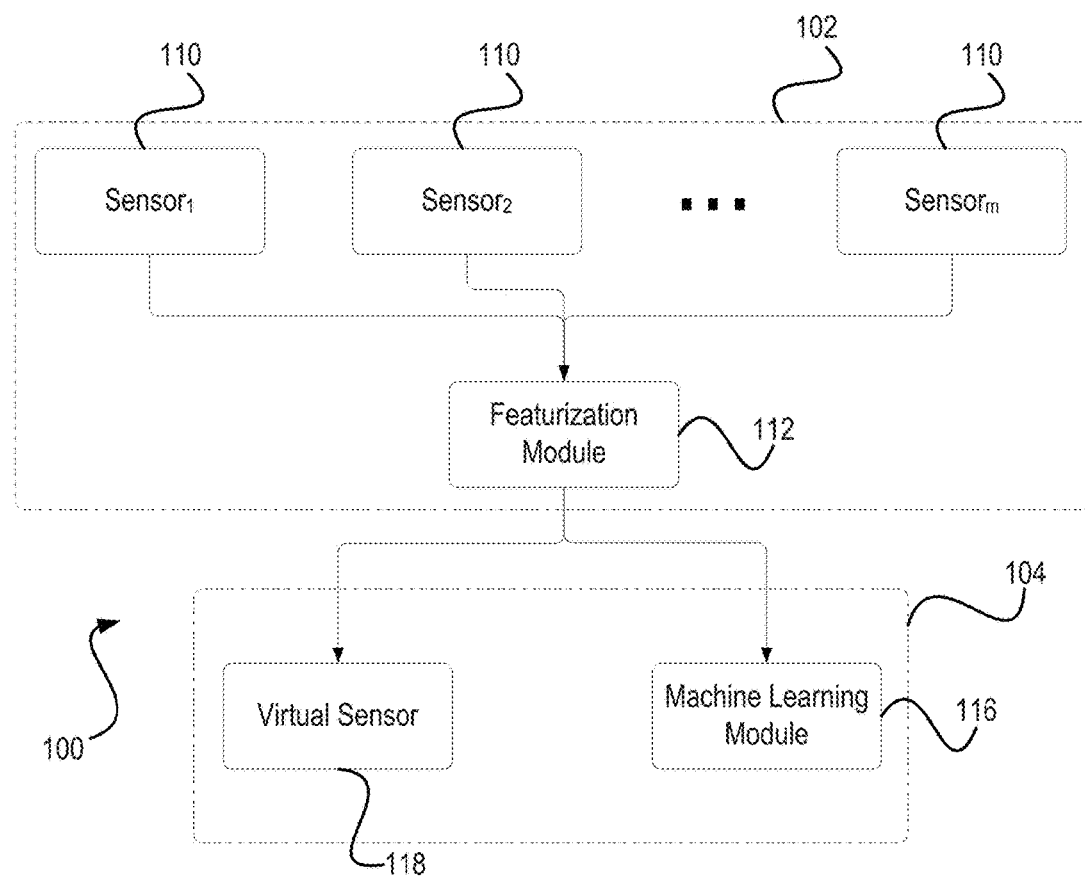
FIG. 1B illustrates a block diagram of the sensing system of FIG. 1A with a trained virtual sensor, in accordance with at least one aspect of the present disclosure.

In one aspect depicted in FIGS. 1A and 1B, the featurization module 112 can be present onboard the sensor assembly 102 so that the data from the sensors 110 can be featurized prior to being transmitted to the computer system 104. In this aspect, the raw sensor data is not transmitted or otherwise stored outside of the sensor assembly 102. This may be advantageous for various reasons. First, the featurization denatures the sensor 110 data, providing an additional degree of data privacy by precluding the transmitted data from being intercepted by an unintended recipient and then reconstructed. For example, data from an acoustic sensor can be converted into a low-fidelity spectral representation in combination with basic statistical features, which precludes the ability to reconstruct the spoken content from the featurized data that is transmitted. Similarly, data from a vision based sensor (e.g., camera) may be featurized and denatured. Second, the featurization reduces the data packet size, which is useful for conserving transmission bandwidth and storage of the sensor 110 data. Alternatively and/or additionally, the featurization module 112 can be present on the computer system 104. In this aspect, some or all of the features are extracted from the raw sensor data after the raw sensor data and/or partially featurized data is transmitted to the computer system 104. This likewise may be advantageous for various reasons, such as by reducing the computational power that is required onboard the sensor assembly 102.

Figure 15A:
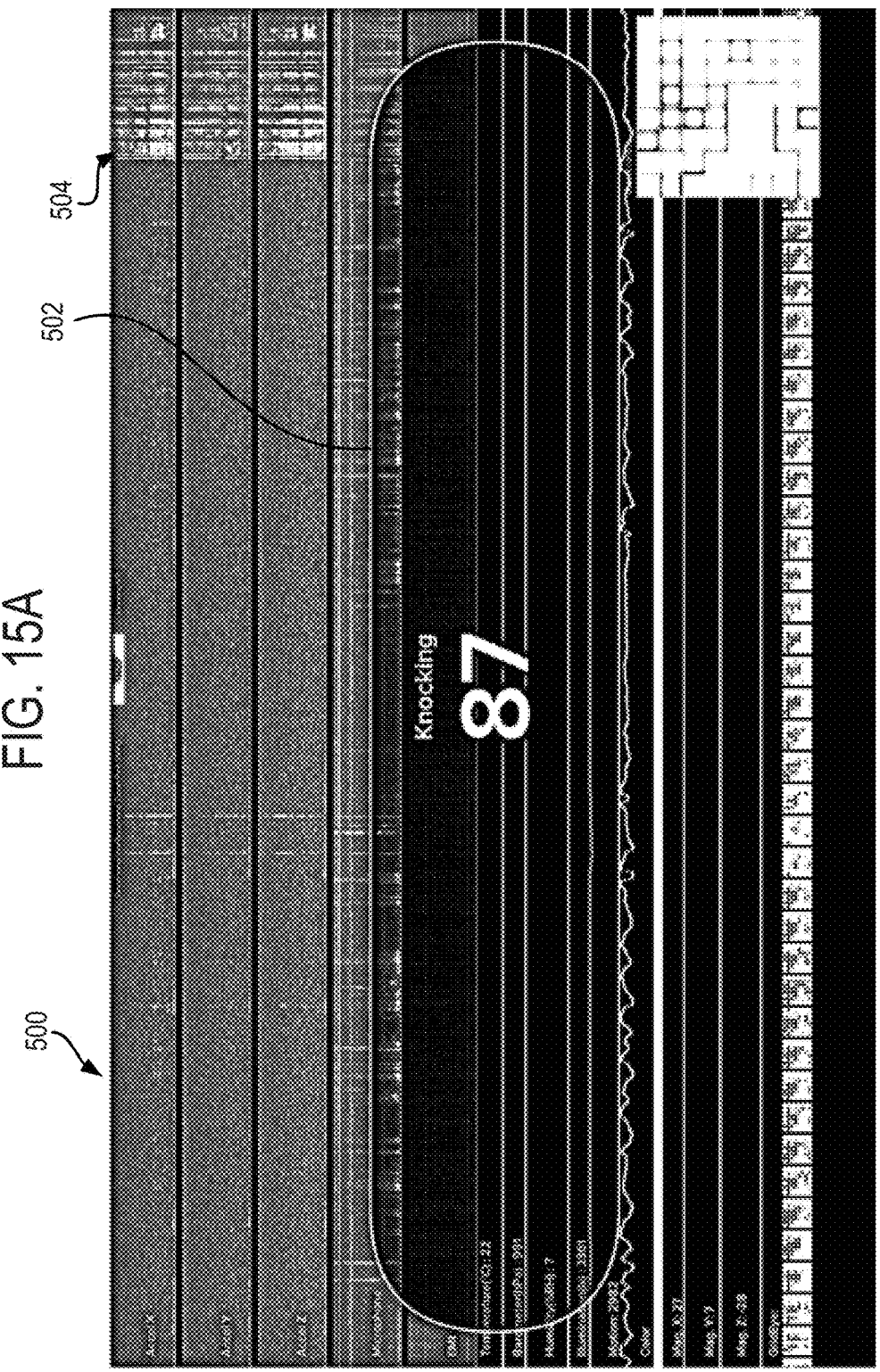
FIG. 15A illustrates a graphical user interface utilized to annotate an event being detected by the sensing system, in accordance with at least one aspect of the present disclosure.
Figure 15B:
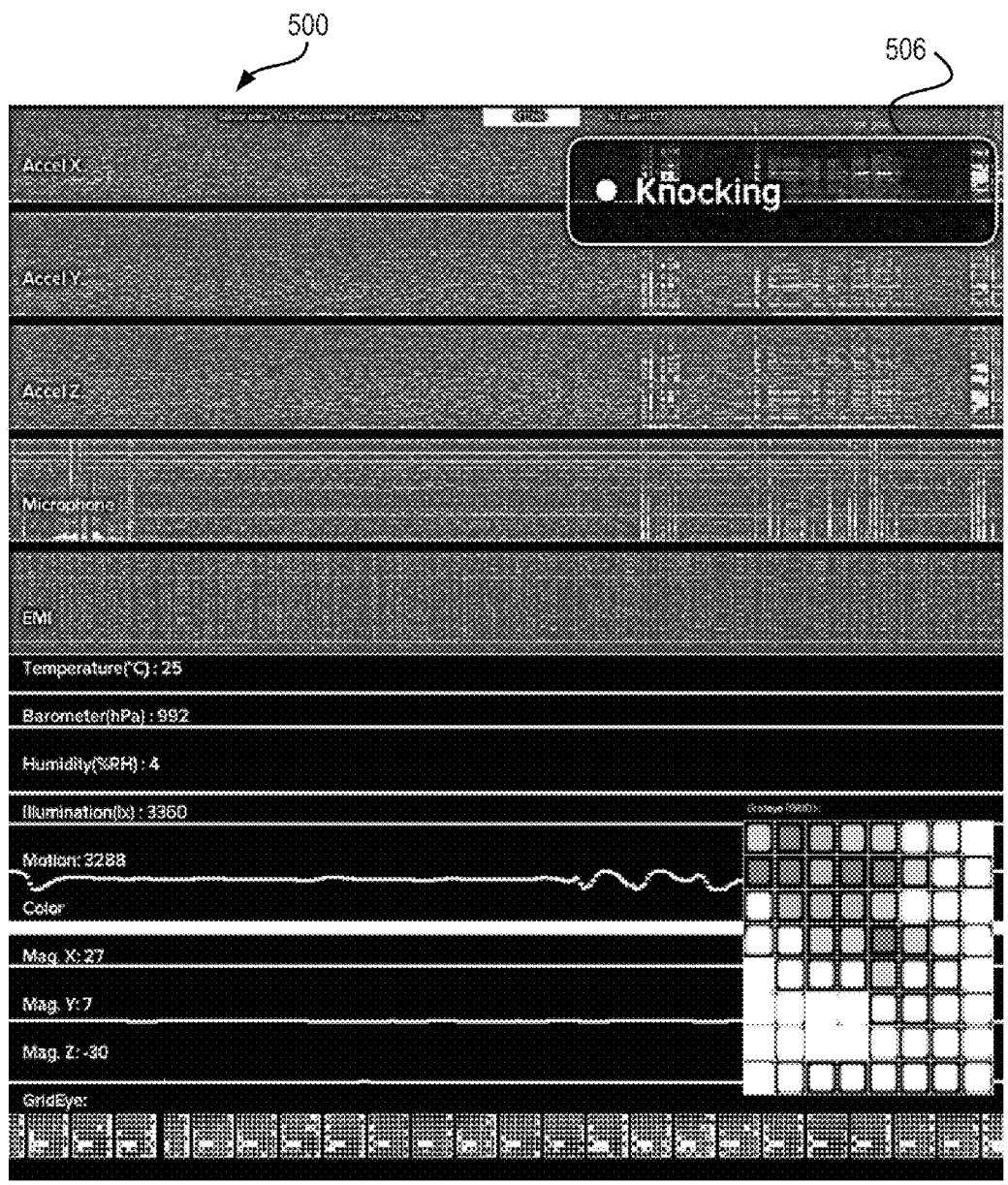
FIG. 15B illustrates a graphical user interface displaying an event being detected by the sensing system, in accordance with at least one aspect of the present disclosure.

After the data is processed by the featurization module 112, the featurized data can be processed and/or analyzed by a machine learning module 116 of the computer system 104 included in the sensing system 100. In one aspect, the machine learning module 116 can generate a machine learning model to detect correlations between the data and events that have occurred. In one aspect, the machine learning module 116 generates a classifier, which is an algorithm that is trained via a machine learning model to assign an input to one or more categories based upon the training that the classifier received. In this aspect, the classifier can be trained to identify the occurrence of a given event based upon the grouped, featurized data that is provided to the machine learning module 116 as training data. In training the classifier to identify an event, the machine learning module 116 can assess the informational power of different sensor channels and may select appropriate thresholds for optimal accuracy in characterizing the training data. The training by the machine learning module 116 causes the classifier to learn what sensor data streams are associated with an event type and, further, what characteristics of those data streams identify the event type with particularity. Once trained to identify an event, a virtual sensor 118 can output a notification and/or signal when the event is detected that causes a graphical user interface 500, an example of which is depicted in FIG. 15B, to display an icon, ideogram, textual alert, or other indicator 506 indicating that the event is being detected.

The machine learning module 116 can utilize supervised learning, unsupervised learning, and/or both techniques in training the classifier. The advantage of using both supervised and unsupervised methods may be that it is an effective method for correlating different types of features from multimodal data. Using both supervised and unsupervised methods may also be advantageous because it enables fine tuning of unsupervised training with supervised training results. Supervised learning is the machine learning task of inferring a function from labeled training data. The training data consists of a set of training examples. In supervised learning, each example is a pair consisting of an input object, typically a vector, and a desired output value or target. The goal is to learn a general rule that maps inputs to outputs. A supervised method may be advantageous because a supervised learning algorithm analyzes the training data and produces an inferred function, which can be used for mapping new examples. Further, an unsupervised method tries to find hidden structure in unlabeled data and includes an algorithm with no target value, i.e., there is no error or reward signal to evaluate a potential solution. Instead, the algorithm has a halting criterion. Examples of halting criteria include, but are not limited to, precision, recall, accuracy, number of cycles, and time. An unsupervised method may be advantageous for use in model training when the only data available is unlabeled data.

In an aspect, the machine learning module 116 can utilize now or hereafter known machine learning methods to detect correlations between the data and events that have occurred, such as various deep learning algorithms, clustering, etc.. In other aspects, after the data is processed by the featurization module 112, the featurized data can be processed by other classification modules, such as a logistic regression module, a clustering module (e.g., k-means, spectral, density based spatial clustering of applications with noise (DBSCAN) and mean-shift), a decision tree module, or a random forest module. In one aspect, the machine learning module 116 comprises an ensemble classification model utilizing, e.g., an algebraic combination technique or a voting (plurality) combination technique. Ensemble classifications models can promote robustness against false positives, while supporting the ability to detect simultaneous events. In one aspect, the machine learning module 116 comprises use base-level support vector machines (SVMs) trained for each virtual sensor, along with a global (multi-class) SVM trained on all sensors. In embodiments where the computer system 104 implements numerous first or higher order virtual sensors 118, the virtual sensors 118 could all use the same machine learning technique or they could use different machine learning techniques. For example, some virtual sensors 118 could use support vector machines, some decision trees, some neural networks, etc. In an aspect, the featurized data may be organized as feature vectors and the feature vectors are fed into the machine learning module 116 as the training data for the classifiers.

In some aspects, after the raw sensor 110 data is processed by the featurization module 112, the featurized data can optionally be processed by an activation group module prior to being transmitted to and/or prior to being processed by the machine learning module 116. In an aspect, the activation group module further processes and converts featurized data from the featurization module 112 into various forms of processed data, as discussed below. In one aspect, the activation group module can be executed on the sensor assembly 102, i.e., prior to the featurized data being transmitted to the computer system 104. In another aspect, the activation group module can be executed by the computer system 104 after the featurized data has been received thereby. Additionally and/or alternatively, the activation group module can be a part of a node between the sensor assembly 102 and the computer system 104 (e.g., a gateway). In aspects including such an intermediate node, the intermediate node can be considered part of the computer system 104 as described herein. In an aspect, the activation group module may also process raw sensor data without featurization.

In an aspect, the activation group module can determine which of the sensors 110 have been triggered at a given time or within a given time window and extract a subset of the data from the sensors as activation group data corresponding to only the activated sensors. Determination of which sensor channels have been activated may reduce the effects of environmental noise on the received sensor data. The activation group module can determine which of the sensors 110 have been triggered or activated by, for example, determining a baseline or background profile of the environment as a calibration routine and using the baseline or background profile to determine which sensors or sensor channels are "activated" by subtracting or otherwise removing the baseline or background profile from the featurized sensor data. In one aspect, the activation group module determines whether a given sensor 110 has been activated by utilizing an adaptive background model for each sensor channel (e.g., rolling mean and standard deviation). In various aspects, all received data streams can be compared against the background profile using, e.g., a normalized Euclidean distance metric. Sensor channels that exceed the baseline by a predetermined threshold (which may be unique for each sensor) are tagged as "activated." In one aspect, the activation group module can further utilize hysteresis to avoid detection jitter. Thresholds can be, e.g., empirically obtained by running the sensors 110 for several days while tracking their longitudinal variances or set by the user or system administrator. In one aspect, the background profile refers to data sensed by a sensor based on ambient condition of an environment that are not related to events of interest, and which the sensing system 100 can obtain when a sensor assembly 102 is initially activated or deployed in a new environment. Alternatively and/or additionally, the sensing system 100 can periodically obtain the environmental background profile for each sensor assembly 102. Obtaining an environmental background profile helps with reducing false positives for the same activity as the baselines change (e.g., for detecting the sound of a particular machine in a factory setting, the constant drone of a fan or other such consistent sounds may be subtracted from the featurized data as a baseline or background profile).

Further, the activation group module can create data sets by subtracting the baseline or background profile from any sensor signals detected by the sensors 110. Such data sets will require less bandwidth for transmission (if the activation group module is part of or executed by the sensor assembly 102) to the computer system 104 for training by the machine learning module 116. Still further, the activation group module can tag the data sets with identification information corresponding to the activated sensors such that the machine learning module 116 knows which sensor streams to consider, and which sensor streams to ignore, when training the machine learning model (e.g., a classifier). This assists in classification by reducing the feature space in which the classifier is trained. The identification of a particular grouping of sensors 110 that have been activated in association with an event can serve as useful metadata to describe the event, which can in turn assist in classifying the event type that has been detected. For example, a boiling kettle can activate infrared, vibration, and/or acoustic sensors of the sensor assembly 102 and a determination by the activation group module that infrared, vibration, and/or acoustic sensors have been activated from amongst a group of sensors 110 of the sensor assembly 102 can itself be used as a feature to assist in classifying the event as a kettle boiling within the detection area of the sensor assembly 102. In some aspects, the activation group module can, optionally, assemble an amalgamated feature vector of the featurized data from the activated sensors, which is then provided to the machine learning module 116.

Referring back to the machine learning module 116, in one aspect where the machine learning module 116 utilizes supervised learning, the sensing system 100 can be configured to provide labels for the featurized data. The labels can be provided by users and/or generated by the sensing system 100.

In aspects where the labels are provided by users, the sensing system 100 can include an interface for users to indicate when and what types of events have occurred, which can then be correlated to the data sensed by the sensor assembly 102. For example, FIG. 15A illustrates a graphical user interface 500 utilized to annotate an event being detected by the sensing system 100, in accordance with at least one aspect of the present disclosure. The graphical user interface 500 could be displayed on a client 106 (FIG. 5) connected to the sensing system 100, the computer system 104, or another computer system or device that is in communication with the sensing system 100. The graphical user interface 500 can allow users to visualize the sensor data streams (which can be either the raw sensor data or the featurized sensor data) and then indicate when various event types occurred, such as by annotating the sensor data streams with events types and the times that the event types occurred. By indicating when various event types occurred, the machine learning module 116 can then train a machine learning model, such as a classifier, to correlate various characteristics of the featurized sensor data streams with the occurrences of the particular events types. For example, the graphical user interface 500 could be utilized to provide a "knocking" annotation 502 at the time on the sensor data stream 504 corresponding to when there was knocking on a door. The annotation 502 thus provides a label for the sensor data for the machine learning module 116 to train a virtual sensor 118 to detect the corresponding event. As another example, a user could annotate a "faulty" label to a vibration sensor reading from a machine in a factory that is vibrating due to mechanical misalignment.

In aspects where the labels are generated by the sensing system 100, the sensing system 100 can automatically generate the labels, by, for example, clustering, deep learning, or other now or hereafter known methods that can be implemented by the machine learning module 116. In one aspect, a user could use the user interface 500 to verify whether any labels automatically generated by the sensing system 100 are correct or incorrect. The machine learning module 116 could then adjust the training of the machine learning model being used to generate the labels to avoid characterizing such false positives. In another aspect, a user could use the user interface 500 to supplement the labels automatically generated by the sensing system 100 or otherwise apply additional labels to the sensor data streams, as described above. The machine learning module 116 could then adjust the training of the machine learning model being used to generate the labels to properly characterize such false negatives. Additionally and/or alternatively, the feature vectors along with their associated labels may be fed into the machine learning module 116 as the training data for the classifiers.

In another aspect where the machine learning module 116 utilizes unsupervised learning, the machine learning module 116 can comprise a deep neural network configured to perform deep learning. As used herein, "deep learning" refers to a form of machine learning that utilizes multiple interconnected neural network layers along with feedback mechanisms or other methods to improve the performance of the underlying neural network. Deep learning systems are usually based on several interconnected layers of a convolution neural network, among other layers, interconnections, or feedback mechanisms. There are many variants of neural networks with deep architecture depending on the probability specification and network architecture, including, but not limited to, deep belief networks (DBNs), restricted Boltzmann machines (RBMs), convolutional neural networks (CNNs), deep neural networks (DNNs), recurrent neural network (RNN)-enhanced models capable of sequential data pattern learning, and autoencoders. Deep-learning models may be trained to learn representations of data using supervised and/or unsupervised learning. From a computational standpoint, the methods used in deep learning involve several mathematical calculations of matrix-to-matrix and matrix-to-vector calculations. The number and nature of these calculations makes them essentially impossible for a human to perform the calculation by-hand or by manual process, within any practical amount of time. In one such aspect, the machine learning module 116 uses a two-stage clustering process. First, the machine learning module 116 reduces the dimensionality of the data set using a multi-layer perceptron configured as an autoencoder. The autoencoder can have, e.g., multiple nonoverlapping sigmoid functions in the hidden layer(s). Because the output of the autoencoder is the same as the input values, the hidden layer(s) will learn the best reduced representation of the feature set. Second, this reduced feature set is used as input to an expectation maximization (EM) clustering algorithm. In other embodiments, the machine learning module 116 can comprise a decision tree, a logistic regression model, a random forest, etc. In one aspect wherein the machine learning module 116 utilizes deep learning, some or all of the featurization or feature extraction may be accomplished automatically using learning from the training data. However, since the accuracy of a deep learning system depends, at least in part, on the sequence in which training data is provided to the deep learning system, pre-processing of the training data (e.g., using featurization by the featurization module 112, using the activation group module, by providing labels, etc.) and selection of training data may be used to improve accuracy of the model. Selection of training data includes, for example, using domain-specific knowledge to improve performance of the machine learning system. Domain expertise, as used herein, provides a context in which a deep learning system can operate and can be used to select elements of training data, the order in which the training data is presented to the deep learning system, and certain sorts of invariances.

In one aspect, the computer system 104 can be further programmed to perform featurization (i.e., featurization at the computer system 104), in addition to and/or as an alternative to the onboard featurization performed by the sensor assembly 102. The additional featurization can include extracting features that would require computationally expensive processing for the sensor assembly 102 hardware to handle or that would be too large to transmit to the computer system 104. The additional features can be computed by the computer system 104 (e.g., the cloud or a remote server) or an intermediate node between the sensor assembly 102 and the computer system 104, such as a gateway. In aspects including such an intermediate node, the intermediate node can be considered part of the computer system 104 as described herein. In various aspects, the computer system 104 (including, potentially an intermediate node) can be configured to compute additional features from data corresponding to one or more high sample rate sensors and/or one or more low sample rate sensors of the sensor assembly 102. The additional features computable by the computer system 104 can include, without limitation, band ratios, fractional harmonics, first or second order signal derivatives, MFCCs, and/or statistical features (e.g., min, max, range, mean, median, mode, sum, standard deviation, and centroid) from raw data from the acoustic, EMI, vibration, or other sensors 110, and/or from already featurized data from the featurization module 112. In one aspect, the computer system 104 can be configured to normalize data from other sensors 110. This server-side featurized sensor data can then be fed, either alone or in combination with the data featurized onboard the sensor assembly 102, to the machine learning module 116 (or, in some aspects, to the activation group module, which in turn feeds into the machine learning module 116) for classification, as described above.

The machine learning module 116 of the computer system 104 is also configured to train one or more virtual sensors 118. In one aspect, the classifier trained by the machine learning module 116 on the provided training data and/or sensor data associated with a given event can be considered a virtual (or synthetic) sensor 118 for that event. For example, a classifier trained by the machine learning module 116 to recognize a boiling kettle according to featurized data from various combinations of infrared, vibration, and/or acoustic sensors of the sensor assembly 102 can be defined as a "kettle boiling" virtual sensor 118. As another example, a classifier trained by the machine learning module 116 to recognize the movement of a door according to featurized data from acoustic and/or vibration sensors 110 can be defined as a "door movement" virtual sensor 118. It should be noted that because each virtual sensor 118 is trained on data collected by a sensor assembly 102 or combinations of sensor assemblies 102, and because such sensor assemblies 102 will be located in a number of different types of environments when utilized in the field, the subset of sensors 110 included in each sensor assembly 102 that are correlated with an event type can vary. Furthermore, the machine learning associated with the same event and same subset of sensors 110 can also vary depending on the environment of the sensor assemblies 102 (e.g., if the background profile is different for the different environments). Specifically, the machine learning model for each virtual sensor 118 could also have different parameters and/or weights for an event based on the environment in which the sensor assemblies 102 are located. Therefore, different virtual sensors 118 (i.e. virtual sensors 118 utilizing different subsets of sensors 110 or having different parameters and/or weights assigned to the event) may be implemented to detect the same event in different locations, different environments, or even over different time periods in the same location. In other words, each virtual sensor 118 will be uniquely trained to detect the occurrence of an event according to the sensor data unique to the particular environment(s) in which the sensor assemblies 102 are located and/or at a particular time. For example, a "door movement" virtual sensor 118 in a first environment and/or during a first time period (e.g., during working hours) could be trained to identify the movement of a door based on a combination of acoustic and vibration data and/or a first machine learning model. However, a "door movement" virtual sensor 118 in a second environment and/or during a second time period (e.g., at night) could be trained to identify a door closing based solely upon acoustic data and/or a second machine learning model. Further, the machine learning model for each virtual sensor 118 could also have different parameters and/or weights based on the environment in which the sensor assemblies 102 are located. The sensing system 100 does not utilize any pre-established restrictions on the training of the virtual sensors 118, thus each virtual sensor 118 will be uniquely trained to detect events according to its environment.

While the above description describes a different virtual sensor 118 (i.e., a classifier or a machine learning model) for each set of unique conditions associated with an event, a single generic virtual sensor 118 could be trained for each event that takes into account a wide variety of conditions related to different environments and over a period of time, without deviating from the principles of this disclosure.

As depicted in FIG. 1B, upon the machine learning module 116 completing the training of the virtual sensor 118 with respect to an event, the virtual sensor 118 can receive and/or subscribe to the data streams from the sensors 110 (i.e., the data streams are transmitted to or pulled by the virtual sensors 118) that were activated in accordance with the event (i.e., the sensors 110 that were correlated with the event). For example, if a "kettle boiling" virtual sensor is correlated with infrared and acoustic sensors, the "kettle boiling" virtual sensor will receive and/or subscribe to the data streams from those particular sensors 118. In one aspect where the sensor assembly 102 and/or the computer system 104 includes an activation group module, the virtual sensor 118 can subscribe to the data streams of the sensors 110 related to the event when the activation group module determines those sensors 110 are activated (i.e., in the above example, when the infrared and acoustic sensors are determined to be activated). Thereafter, the virtual sensor 118 monitors for the occurrence of the event that the virtual sensor 118 was trained to detect from the data feed transmitted by the correlated sensors 110 of the sensor assembly 102 to the computer system 104. The virtual sensors 118 can thus detect actions or events directly and/or indirectly (i.e., without requiring that a sensor 110 be physically connected or otherwise associated with the object or person being sensed) by being trained to correlate stimuli detected by the sensors 110 incorporated within the sensor assembly 102 with the occurrences of the particular events.

In one aspect depicted in FIG. 1B, the virtual sensors 118 can be implemented by the computer system 104, i.e., the same computer system 104 on which the virtual sensors 118 are trained by the machine learning module 116. In other aspects, the virtual sensors 118 can be stored on and/or implemented by a second computer system. For example, the virtual sensors 118 can be stored in a library after they are trained. Other computer systems can then access the library of previously trained virtual sensors 118 for different activities and events and then utilize the previously trained virtual sensors 118 to sense the occurrence of events according to data from their own sensor assemblies 102. Such other computer systems may also update a previously trained virtual sensor 118.

Although FIG. 1A depicts a virtual sensor 118 being trained and FIG. 1B depicts a resulting trained virtual sensor 118 subscribing to data streams from the sensor assembly 102, this is described for the sake of convenience and not with an intent of limiting the disclosure as comprising a series and/or a number of steps. It is to be understood that the creation and implementation of virtual sensors 118 to detect events does not need to be performed as a series of steps and/or the steps do not need to be performed in the order shown and described with respect to FIGS. 1A and 1B. In other words, the creation and implementation steps may be integrated and/or may be performed together, or the steps may be performed in the order disclosed or in an alternate order. Furthermore, creation of the virtual sensor 118 is an iterative process and the training of the classifier that forms the virtual sensor 118 may continue to improve and/or modify the virtual sensor 118 (e.g., using a feedback loop).

Furthermore, although FIGS. 1A and 1B depict a single virtual sensor 118 being trained and then implemented, the computer system 104 can train any number of virtual sensors 118 to detect the same event in a variety of environments (or at different times) and/or a variety of events. For example, FIG. 2 depicts the sensing system 100 wherein the computer system 104 has been trained to implement n virtual sensors 118 based on data from m sensors 110 incorporated with the sensor assembly 102, where n can be greater than, equal to, or less than m. Each virtual sensor 118 can subscribe to (i.e., receive data from) the data stream of one or multiple sensors 110, in any combination. In various embodiments, as described further below, there could be multiple sensor assemblies 102 sensing different spaces of a larger environment (e.g., a building or campus), and each of the sensor assemblies 102 is in communication with the computer system 104 as described above. In that case, a virtual sensor 118 could rely on featurized data from different sensor assemblies 102 in making a classification.

Figure 3A:
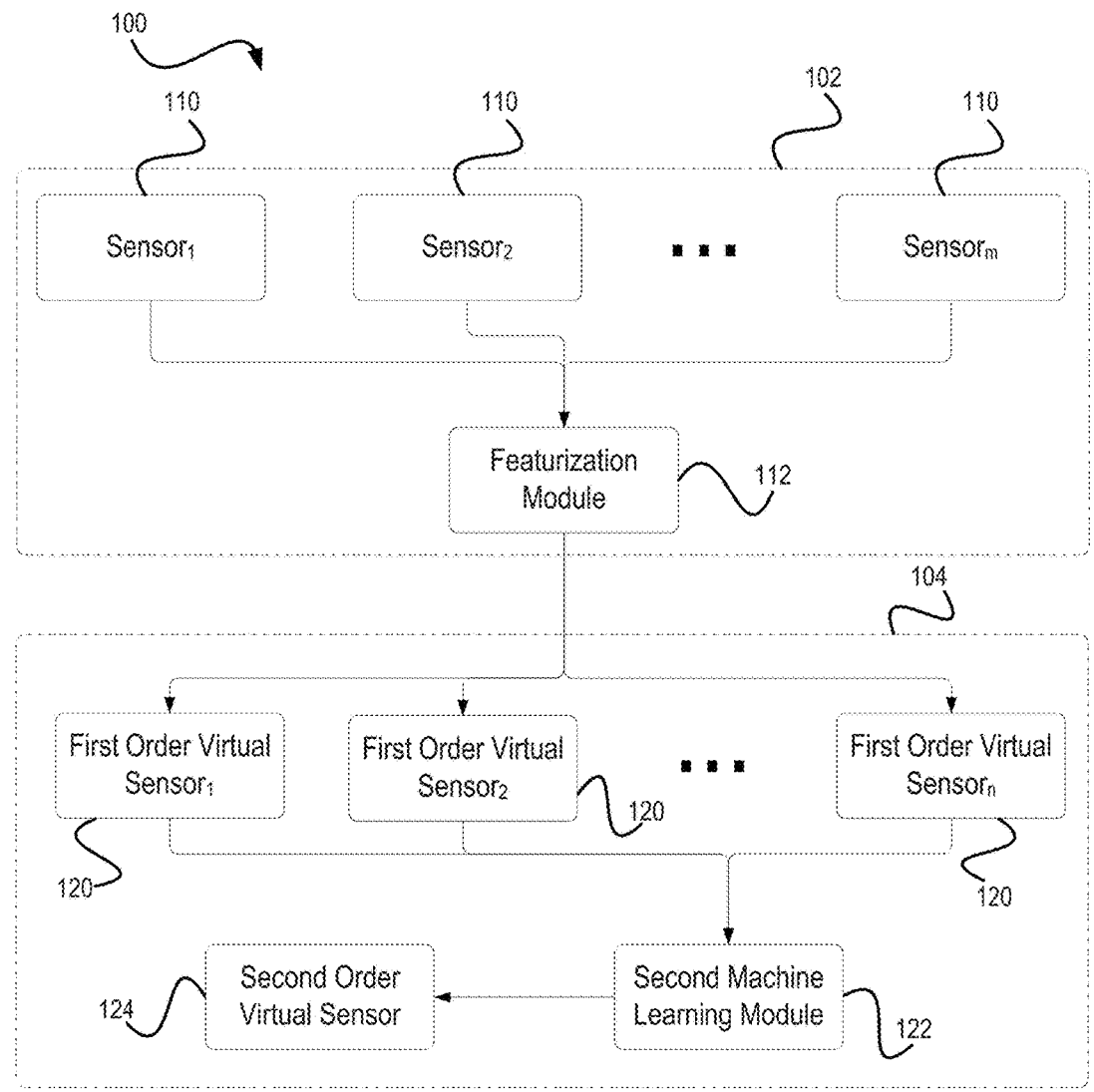
FIG. 3A illustrates a block diagram of a sensing system, in accordance with at least one aspect of the present disclosure.

FIG. 3A illustrates a block diagram of a sensing system 100, in accordance with at least one aspect of the present disclosure, with various components such as the machine learning module 116 omitted for clarity. In some aspects, the sensing system 100 can include a hierarchical structure of virtual sensors 118. The virtual sensors 118 that receive the featurized data from the sensors 110 of the sensor assembly 102 to make their classifications can be referred to as first order virtual sensors 120. The computer system 104 can further be configured to implement second order virtual sensors 124 that receive and process, among other things, the outputs of one or more first order virtual sensors 120 to make their "second order" classifications; third order virtual sensors that receive and process, among other things, the outputs of one or more second order virtual sensors 124 to make their "third order" classifications; and so on for subsequent orders of virtual sensors 118. Described generally, the computer system 104 can be configured to implement xth order virtual sensors that receive the outputs from one or more (x-1)th or lower order virtual sensors to detect the occurrence of an event or condition (e.g., make a classification that the event occurred or that a condition is or is not present).

The second order virtual sensors 124 could also subscribe to and/or receive other, non-first order virtual sensor data. For example, in some embodiments, a second order virtual sensor 124 could receive data from at least one first order virtual sensor 120, as well as featurized data from one or more of the sensors 110 of the sensor assembly 102, in order to make its classification. This applies to higher order sensors as well. A xth order virtual sensor could receive data from at least one (x-1)th order sensor, as well as either (i) data from lower order sensors (e.g., (x-2)th, (x-3)th, etc.) and/or (ii) featurized data from one or more of the sensors 110 of the sensor assembly 102, in order to make their classification.

In some aspects, the higher order virtual sensors can include algorithms that, for example and without limitation, count the number of occurrences or duration of an event detected by a lower order virtual sensor, algorithms that smooth the outputs of lower order virtual sensors (and, in some cases, the sensors 110 of the sensor assembly 102), algorithms that combine the outputs of multiple lower order virtual sensors and/or sensors 110 (featurized and/or raw data), or the like. As an example of a higher order virtual sensor that can combine the outputs of lower order sensors, a second order virtual sensor 124 could indicate whether an occupant is present within a home by analyzing the outputs of multiple human activity-related first order virtual sensors 120, such as a "washing dishes" first order virtual sensor 120, a "movement in the kitchen" first order virtual sensors 120, and so on. In another example, a third order virtual sensor could output an alarm if the second order virtual sensor 124 determines that a home owner is not present (e.g., by determining that for a threshold period of time the first order virtual sensors 120 have indicated that no lights have not been turned on) and another first order virtual sensor 120 detects a fire event. In these aspects, the higher order virtual sensors can receive the outputs of one or more lower order virtual sensors and/or sensors 110 of the sensor assembly and then make its corresponding classification accordingly.

In some aspects, the higher order virtual sensors can, as with the first order virtual sensors 120, include classifiers trained by a machine learning module on the output from one or more lower order sensors to identify the occurrence of a trained-for event or condition. The higher order virtual sensors can be trained on the outputs of at least one immediately lower order of virtual sensor in the hierarchical structure, rather than strictly on the outputs of the sensors 110 of the sensor assembly 102. For example, FIG. 3A depicts the computer system 104 including a second machine learning module 122 that receives the outputs (data) from the first order virtual sensors 120 to generate a second order virtual sensors 124. In some aspects, the data from the first order virtual sensors 120 can additionally be processed by a featurization module and/or an activation group module, as described above with respect to FIGS. 1A and 1B, prior to being processed by the second machine learning module 122. In such aspects, the computer system 104 can also implement a featurization module for featurizing the data from a virtual sensor 118. In the aspect depicted in FIG. 3B, upon the second machine learning module 122 completing the training of the second order virtual sensor 124, the second order virtual sensor 124 receives data streams from the first order virtual sensors 120 that the second machine learning module 122 determined correlated to the event that the particular second order virtual sensor 124 was being trained on. Thereafter, the second order virtual sensor 124 monitors for the occurrence of the event that the second order virtual sensor 124 was trained to detect from the data feed generated by the first order virtual sensors 120.

Figure 3B:
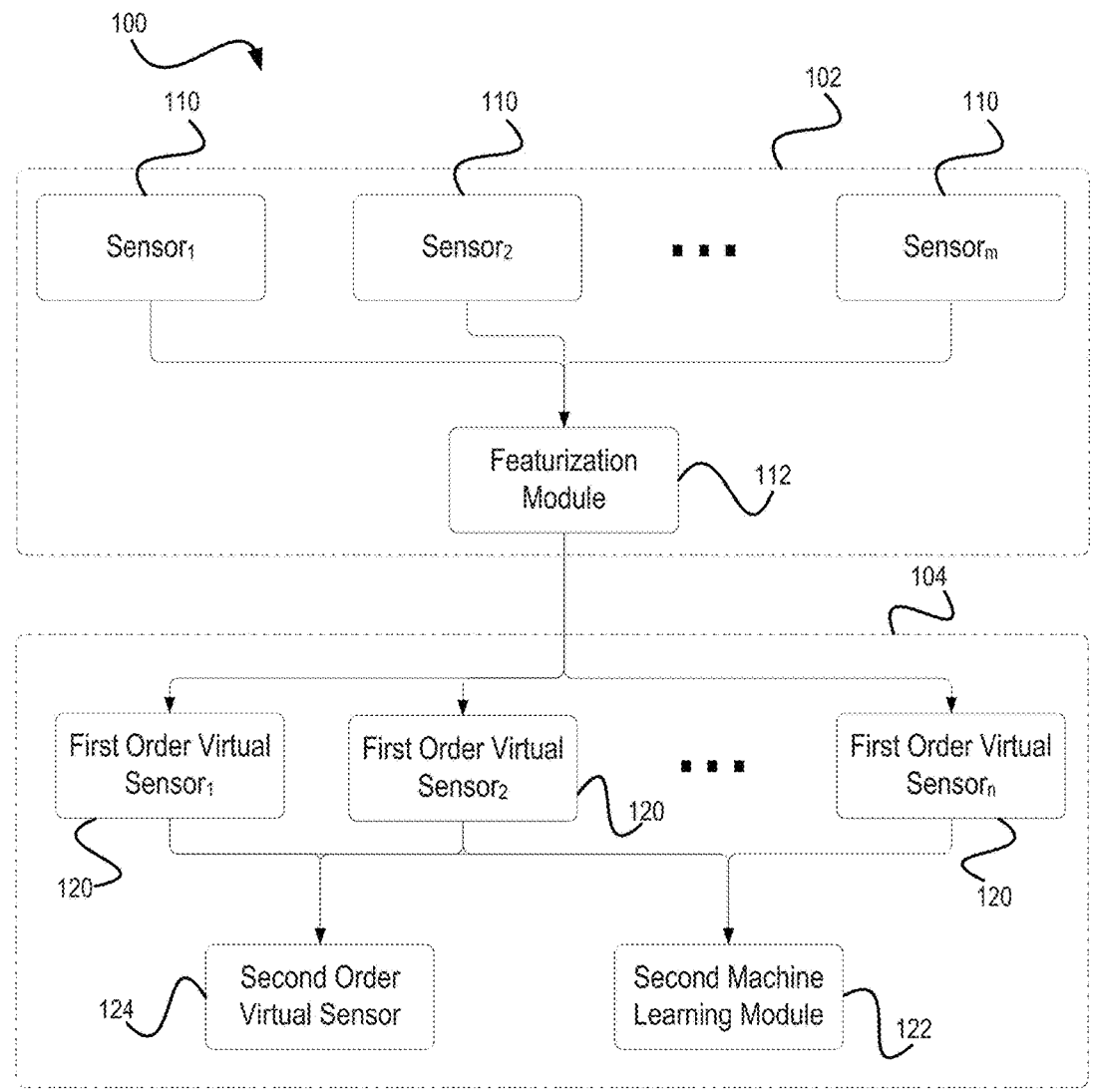
FIG. 3B illustrates a block diagram of the sensing system of FIG. 3A with a trained second order virtual sensor, in accordance with at least one aspect of the present disclosure.
Figure 4:
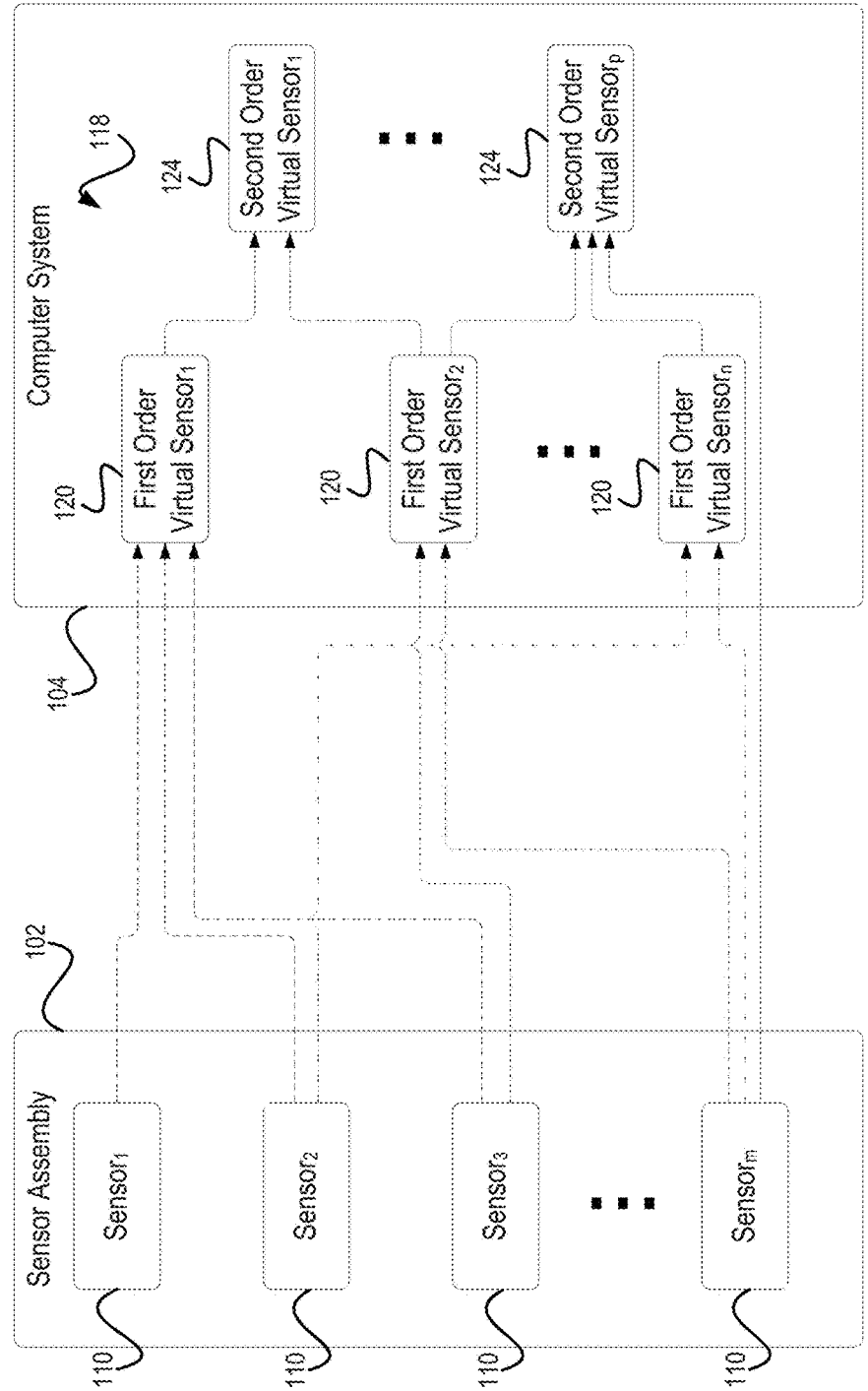
FIG. 4 illustrates a block diagram of a sensing system including sensors, first order virtual sensors, and second order virtual sensors receiving data hierarchically, in accordance with at least one aspect of the present disclosure.

Although FIGS. 3A and 3B depict a single second order virtual sensor 124 being trained and then implemented, the computer system 104 can train any number of higher order virtual sensors 118 to detect a variety of events. For example, FIG. 4 depicts the sensing system 100 wherein the computer system 104 has been trained to implement p second order virtual sensors 124 and n first order virtual sensors 120 based on data from m sensors 110 incorporated with the sensor assembly 102, where p can be greater than, equal to, or less than n. Each second order virtual sensor 124 can subscribe to (i.e., receive data from), at least, the data stream of one or multiple first order virtual sensors 120, in any combination. Further, these same principles apply to third and higher order virtual sensors implemented by the computer system 104. Additionally, FIG. 4 depicts the higher order virtual sensors receiving data from different levels or orders of sensors. For example, the pth second order virtual sensor 124 is depicted as receiving data from the mth sensor 110, in addition to data from the directly preceding 2nd and nth first order virtual sensors 120.

In one aspect, the first order virtual sensors 120 can produce a binary output (e.g., are binary classifiers). For example, a first order virtual sensor 120 trained to identify whether a faucet is running or whether someone is at their desk working could produce a continuous, time-stamped binary "yes" or "no" outputs. In this aspect, higher order virtual sensors can further produce nonbinary outputs, such as state (of an object or environment), count, and duration. For example, the sensing system 100 could implement five separate first order virtual sensors 120 that track five separate aspects of a microwave: whether the microwave is running, the keypad has been pressed, the door has been opened, the door has been closed, and the completion chime has sounded. From these time-stamped binary outputs of the first order virtual sensors 120, a second order virtual sensor 124 could generate a nonbinary output of the states of the microwave: available, door ajar, in-use, interrupted, or finished. In one implementation, when the completion chime is detected (i.e., the "completion chime" first order sensor 120 is activated), the microwave state output of the second order virtual sensor 124 can change from "in-use" to "finished." The microwave state output can stay as "finished" until a "door closed" event is detected (i.e., the "door closed" first order virtual sensor 120 is activated), after which the items inside the microwave are presumed to have been removed and the microwave state output of the second order virtual sensor 124 is changed to "available." Second order virtual sensors 124 need not be connected to multiple first order virtual sensors 120 to produce nonbinary outputs though. As another example, the sensing system 100 could implement a first order virtual sensor 120 that detects when a door is opened and a second order virtual sensor 124 that counts the number of times that the first order virtual second 120 has been activated. As yet another example, the sensing system 100 could implement a first order virtual sensor 120 that detects when a faucet is running and a second order virtual sensor 124 that tracks the time duration that the first order virtual sensor 120 is activated. That way, an approximation of the total amount of water used could be computed. These are examples of just a few of the first and second order virtual sensors that can be implemented in various embodiments of the present invention. In other aspects, the first order virtual sensors 120 can produce nonbinary outputs. For example, the first order virtual sensors 120 could include multi-class classifiers trained to output one of several labels. As described above, the first and second (or higher order) virtual sensors could be trained to detect other, binary or nonbinary, conditions, states, durations, etc.

By having lower order virtual sensors feed into higher order virtual sensors, the sensing system 100 can infer increasingly richer details about the environment in which the sensor assembly 102 is located. Further, multiple sensor assemblies 102 can be communicably connected to the computer system 104 and the data feeds from the multiple sensor assemblies 102 can be combined to provide additional data that can be processed by machine learning to infer information about the environment from correlated data from the sensor assemblies 102. For example, one or more appliance-level second order virtual sensors could feed into a kitchen-level third order virtual sensor, which could in turn feed into a house-level fourth order virtual sensor, and so on. A house-level virtual sensor drawing on multiple lower order sensors (whether they are virtual sensors or actual sensors disposed on one of the sensor assemblies within the house) across many rooms can classify complex facets like human activity. Tracking human activities accurately can be very useful in a variety of contexts, such as with smart homes, healthcare tracking, managed care for the elderly, and security and safety of human occupants.

The outputs of the various virtual sensors 118 can further be fed into applications executed by the computer system 104, an external client 106 (FIG. 5), and/or other local or remote computer systems via, e.g., an application program interface (API). In these aspects, the computer system 104, a client 106 (FIG. 5), and/or other computer systems may execute a virtual machine receiver program or application to display the output in an application window, a browser, or other output window. For example, the output of a virtual sensor 118 counting the number of times that paper towels are dispensed from a particular dispenser could be fed into a local or remote application that automatically orders paper towels once the count has reached a threshold. As another example, the output of a virtual sensor 118 which tracks anomalous conditions of a machine by considering vibrations and audio signatures could be fed into a local or remote application that notifies the machine maintainer by sounding an alarm and shuts down the machine safely. As another example, the output of a virtual sensor 118 tracking the duration that a light is on in a room could be fed into a local or remote application that automatically turns the light off once the duration has reached a threshold. As yet another example, the output of a virtual sensor 118 monitoring the state of a washing machine could be fed into a local or remote application that automatically notifies the user (e.g., via a text message or a push notification on the user's mobile phone) when the drying cycle of the washing machine has completed. As yet another example, event detections from multiple first order virtual sensors 120 located in a home could be fed to a second order virtual sensor 124 to track the various activities of the occupant of a home (e.g., daily routines), which are then fed into an anomaly detection system (which may be an even higher order virtual sensor or a separate application) to notify a caregiver if an elderly person's patterns deviate from their normal patterns (e.g., if the tracked individual falls down, fails to wake up at the usual time, etc.). The different manners in which the outputs of the virtual sensors 118 can be utilized are essentially limitless.

FIG. 5 illustrates a block diagram of a sensing system 100 including multiple sensor assemblies 102 communicably coupled to a computer system 104, in accordance with at least one aspect of the present disclosure. Each of the sensor assemblies 102 includes a plurality of sensors 110 for detecting various physical or natural phenomena in the environment in which the sensor assembly 102 is located and a control circuit for executing the various functions of the sensor assembly 102. The control circuit can include, for example, a processor coupled to primary and/or secondary computer memory for executing instructions stored on the memory, a microcontroller, an application-specific integrated circuit (ASIC), a field-programmable gate array (FPGA), and other such devices. In the depicted example, the sensor assembly 102 includes a microcontroller 121 that includes a processor 123 coupled to a memory 125. The microcontroller 121 executes firmware 129, including system firmware 129A and application firmware 129B, stored in the memory 125 and a clock 127. The firmware 129 can include, for example, firmware for the featurization module 112 (see FIG. 1), which can be executed by the control circuit (e.g., microcontroller 121). In some aspects, the control circuit (e.g., microcontroller 121) can be embodied as a system on a chip (SoC).

The sensor assembly 102 is communicably connectable to the computer system 104 (e.g., one or number of networked servers) such that the computer system 104 can receive the signals or data generated by the sensors 110 for processing thereon, as described above. In the depicted example, each sensor assembly 102 is communicably connectable to the computer system 104 via a data communication network 108, such as the Internet, a LAN, a WAN, a MAN, or any other suitable data communication network. In this aspect, the sensor assembly 102 can include an appropriate network interface for connecting to the data communication network 108 such as, for example, a Wi-Fi network interface controller. In other aspects, the sensor assembly 102 can communicably connect to the computer system 102 utilizing other wired or wireless communication protocols or other communication networks (e.g., a cellular telecommunication network or Ethernet). The network interface controller of the sensor assembly 102 may include a network interface controller suitable to implement wireless or wired communication utilizing a variety of communication protocols and/or access methods, such as cellular, Bluetooth, ZigBee, RFID, Bluetooth low energy, NFC, IEEE 802.11, IEEE 802.15, IEEE 802.16, Z-Wave, HomePlug, global system for mobile (GSM), general packet radio service (GPRS), enhanced data rates for GSM evolution (EDGE), code division multiple access (CDMA), universal mobile telecommunications system (UMTS), long-term evolution (LTE), LTE-advanced (LTE-A), LoRa (or another lower power wide-area network communication protocol), or any other suitable wired and/or wireless communication method or combination thereof. The network 108 may include one or more switches and/or routers, including wireless routers that connect the wireless communication channels with other wired networks (e.g., the Internet). The data communicated in the network 108 may include data communicated via short messaging service (SMS), multimedia messaging service (MMS), hypertext transfer protocol (HTTP), direct data connection, wireless application protocol (WAP), email, smart energy profile (SEP), ECHONET Lite, OpenADR, or any other protocol that may be implemented with the sensor assemblies 102, physical hubs, cloud sever communication, or gateway modules.

In certain aspects, one or more of the sensor assemblies 102 may also be communicably connected to each other, and/or to a client 106 (e.g., a user device) via the network 108 and/or via a separate network. For example, such a network may be a local network established by a local router or a local switch. Optionally, the sensor assemblies 102 may be a peer-to-peer (P2P) network, and may communicate with each other directly. In a peer-to-peer network, service discovery schemes can multicast the presence of nodes, their capabilities, and group membership. The peer-to-peer devices can establish associations and subsequent interactions based on this information.

A sensing assembly 102 may implement one or more application-layer communication protocols. Examples include constrained application protocol (CoAP), message queue telemetry transport (MQTT), OPC UA, HTTP, REST APIs and the like for implementing a respective messaging protocol. Sensing assembly 102 may also implement lower-layers communication protocols which may implement layers of a communication protocol stack lower than the application-layer. Example layers implemented may include one or more of the physical, data link, network, transport, session, internet, and presentation protocols. Example protocols implemented include one or more of: Ethernet, Internet Protocol, Transport Control Protocol (TCP), protocols for the 802.11 standard (e.g., PHY, Medium Access Control, Logical Link Control, and the like), and the like.

In one embodiment, the computer system 104 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server or a hypervisor executing on a user device.

In some embodiments, the client 106 may display application output generated by an application remotely executing on a server or other remotely located machine (for e.g., for controlling, communicating and/or accessing data from a sensor assembly 102 and/or controlling and/or communicating with various objects of an environment being sense). In these embodiments, the client device may execute a virtual machine receiver program or application to display the output in an application window, a browser, or other output window.

Figure 6:
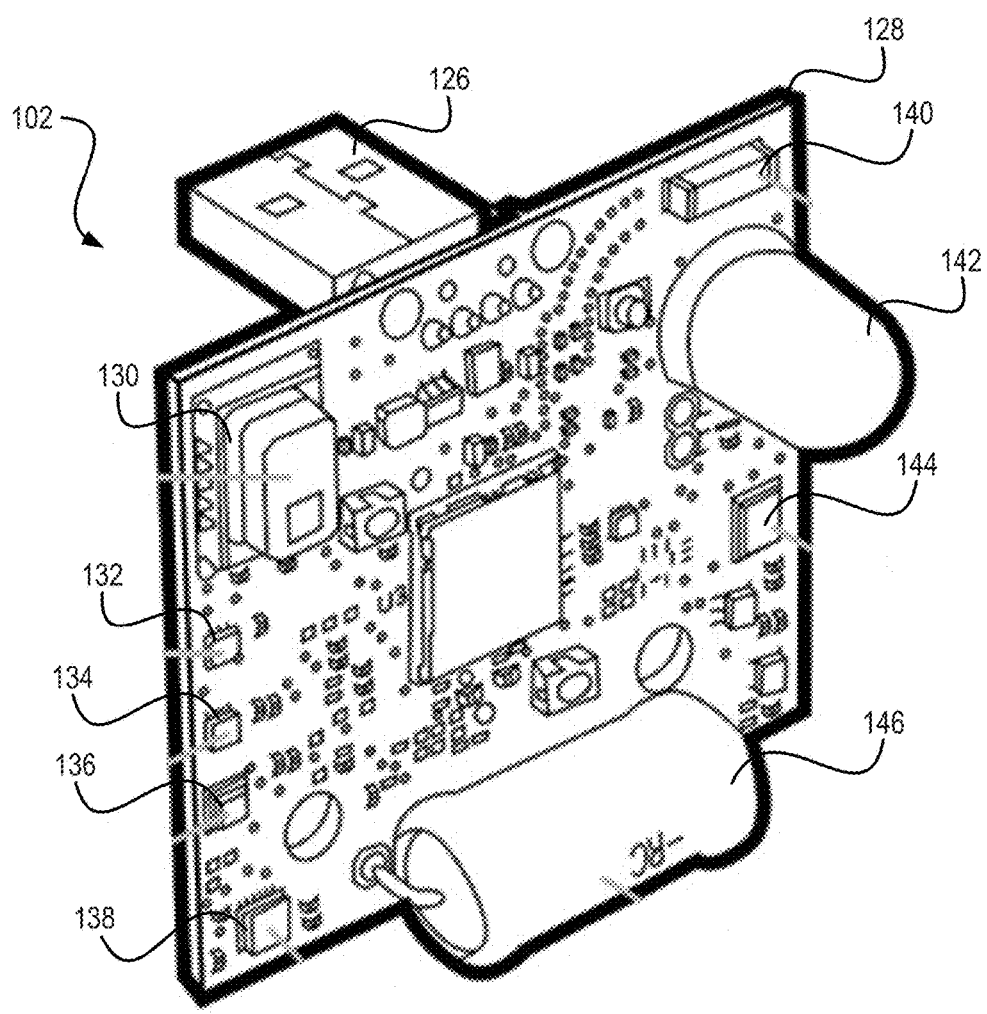
FIG. 6 illustrates a perspective view of a sensor assembly, in accordance with at least one aspect of the present disclosure.

FIG. 6 depicts an embodiment of the sensor assembly 102 according to various embodiments. As shown in FIG. 6, in various embodiments, the sensor assembly 102 comprises a single circuit board 128 with the various sensors and control circuit connected thereto. As depicted in FIG. 6, sensors and control circuit can be positioned on one side of the circuit board, and the sensor assembly 102 can further comprise a connector 126 (e.g., a USB connector, power plug, or Ethernet connector for providing power via a power-over-Ethernet interface) on the opposite side of the circuit board for supplying power to the sensors 110, microcontroller 121, and other electronic components of the sensor assembly 102. In one aspect, the sensor assembly 102 is intended to be plugged into an electrical outlet within the area or environment to be monitored by the sensor assembly 102. When secured to the power source via the connector 126, the sensor assembly 102 can be held in a stationary, non-mobile position relative to the object to which it is connected or a reference frame. By being plugged directly into a power source (e.g., an electrical outlet), the sensor assembly 102 does not strictly require a power source that must be replaced or recharged, obviating the need to limit the processing power of the sensor assembly 102 and the number and/or utilization of the sensors 110 in order to attempt to conserve power. Further, by being held stationary with respect to the object to which it is connected or a reference frame, the sensor assembly 102 can utilize certain types of sensors (e.g., vibration sensors) to detect changes in the environment within the vicinity of the sensor assembly 102 relative to a fixed position. In these aspects where the sensor assembly 102 is configured to be plugged directly into an electrical outlet, the sensors 110 can be selected to account for the potential suboptimal placement of the sensor assembly 102 relative to the object or location being sensed. The sensor assembly 102 may need to be placed in a suboptimal location because the placement of the sensor assembly 102 will be contingent upon the location of an electrical outlet, which means that the sensor assembly 102 could potentially be located a relatively far distance from the object or location being sensed. Therefore, the sensors 110 can utilize indirect sensing techniques.

As mentioned above, in one aspect, the sensors 110, connector 126, microcontroller 121, and various other components of the sensor assembly 102 can be supported upon a printed circuit board (PCB) substrate 128. In one aspect, the sensors 110 can be disposed on a first surface of the PCB substrate 128 and the connector 126 can be disposed on a second, opposing surface of the PCB substrate 128 so that the sensors 110 are oriented outwardly towards the environment when the connector 126 is plugged into or connected to a corresponding socket. In other aspects, the sensors 110 can be mounted on various layers of the PCB substrate 128. For example, sensors 110 such as, without limitation, an EMI sensor configured to measure the electro magnetic interference in the line voltage of a power circuit caused by an electrical device may be included in a first one or more layer(s) of the PCB substrate 128 and other sensors 110 may be included in a different layer of the PCB substrate. In one aspect, the sensor assembly 102 further includes a housing enclosing the various components. That is, the housing can house the PCB substrate 128 and the sensors 110 connected thereto. The housing can protect against physical damage and electrostatic discharge. Further, the housing can be designed to accommodate sensors 110 that require line of sight and access to the environment's air by, for example, having access cutouts for the relevant sensors 110. The housing could be constructed from, for example, laser cut cast acrylic and/or constructed via injection molding or 3D printing processes. In other apects, the sensor assembly 102 could comprise multiple PCB substrates, with the sensors 110 on different PCB substrates. In such embodiments, the housing can enclose all of the sensors 110 and PCB substrates.

The sensors 110 can include various combinations of sensing devices that are configured to detect various different physical or natural phenomena. In one aspect, the sensors 110 include an infrared radiation sensor 130 (e.g., a Panasonic Grid-EYE AMG8833 infrared array sensor), an ambient light color and/or intensity sensor 132 (e.g., a TAOS TCS34725 RGB sensor), a magnetic field sensor 134 (e.g., a Freescale Xtrinsic MAG3110 magnetometer), a temperature sensor 136, an ambient pressure sensor, a humidity sensor (e.g., all part of a Bosch BME280 environmental sensor), an air quality or air composition sensor (e.g. a Bosch BME680 sensor for sensing the presence of certain volatile organic compounds), a vibration sensor 138 (e.g., an InvenSense MPU-6500 accelerometer six-axis accelerometer and gyroscope motion tracking sensor, which can detect vibrations through the structure when the sensor assembly 102 is secured to an electrical outlet), an external device detection sensor 140 (e.g., a 2.4 GHz Wi-Fi network interface controller for detecting the presence and/or activity of external electronic devices connected to the Wi-Fi network or a Bluetooth LE sensor for detecting the presence of external electronic devices in the vicinity of the sensor assembly 102), a motion sensor 142 (e.g., a Panasonic AMN21111 PIR motion sensor), an acoustic sensor 144 (e.g., an Analog Devices ADMP401 microphone), and/or an EMI sensor 146 (e.g., a 100 mH inductor to capture over-air EMI and/or a passive RC network to sense EMI changes in the line voltage of the power source to which the sensor assembly 102 is connected). Various implementations of the sensor assembly 102 can utilize any number and combination of the aforementioned sensors and any other types of sensors 110 for detecting physical or natural phenomena. Further, the sensors 100 can be analog or digital sensors. Preferably, the sensor assembly 102 does not comprise a high-resolution camera (i.e., higher resolution than a thermal imager, such as an infrared radiation sensor 130). As such, the sensing system 100 can make the detections and classifications described herein without use of a camera, which decreases the cost and power consumption of the sensor assembly 102. It also decreases the amount of data that needs to be featuruzized onboard and transmitted to the computer system 104 since there is no image data to featurize and transmit. Further, not employing a camera reduces privacy concerns and image data of the environment of the sensor assembly 102 are not captured. Even when a high-resolution camera is employed on the sensor assembly 102, the image data can be featurized onboard the sensor assembly 102 so that privacy is maintained in the data sent to the computer system 104.

In one aspect, the sensor assembly 102 can further include one or more interfaces that can be utilized to connect to or communicate with additional sensors external to the sensor assembly 102. The interfaces can include, for example, Serial Peripheral Interface (SPI), Inter-Integrated Circuit (I$^2$C), General Purpose Input/Output pins (GPIOs), and/or universal asynchronous receiver-transmitter (UART). The interfaces allow additional external sensors to be connected to the sensor assembly 102 in order to supplement and/or extend the functionality of the sensor assembly 102. Additional sensors that could be modularly connected to the sensor assembly 102 via the interfaces could include, for example, motion sensors (e.g., Doppler radar sensors), EMI sensors configured to detect the transients caused in the line voltage of the power source directly to which the sensor assembly 102 is connected, a lidar sensor, an ultrasonic sensor, and/or an active noise management system.

The sensors 110 of the sensor assembly 102 can include passive sensors and/or active sensors. A passive sensor is a sensor that simply detects or senses various physical or natural phenomena of an environment. Examples of such passive sensors are described above and may include, without limitation, vibration sensors, microphones, EMI sensors, infrared radiation sensors, acoustic sensors, temperature sensors, humidity sensors, camera, motion sensors (e.g., accelerometer, gyroscope, etc.), electric field sensors, chemical sensors, photo sensors, or the like. An active sensor is sensor used for measuring signals transmitted by the sensor that were reflected, refracted or scattered by an object of the environment and/or disturbances caused by the transmitted signals in the environment. Examples of such active sensors include, without limitation, sonar sensors (e.g., Doppler sensors), ultrasonic sensors, radar sensors, lidar sensors, acoustic sensors, infrared cameras, active IR sensors, indoor positioning systems, x-ray sensors, seismic sensors, active sound measurement systems, light emitting systems, or the like. In an aspect, an output device (described below) of a sensor assembly 102 may be configured to transmit a signal that may be reflected, refracted or scattered by an object of the environment and/or may cause disturbances in the environment, where such reflection, refraction, scattering, and/or disturbance is subsequently sensed by a sensor 110 of the sensor assembly 102, thereby forming an active sensor assembly 102 without an actual active sensor 110. The data from such active sensors could be featurized and used to detect events/conditions by the first or second (or higher) order virtual sensors. The active sensors could also be used to calibrate a space in which the sensor assembly 102 is located, as described further below. The data from such active sensors could be featurized and used to detect events/conditions by the first or second (or higher) order virtual sensors, just like the passive sensors as described above. The active sensors could also be used to calibrate a space in which the sensor assembly 102 is located, as described further below. Furthermore, an active sensor can be used for authentication of an object and/or a person as described below.

In aspects wherein the sensor assembly 102 includes an active sensor, such as an acoustic sensor (e.g., a microphone), the acoustic sensor can be utilized via an active sound management system that transmits a sound signal and receives the reflected, refracted and/or refracted signal to determine, for example, the sensor assembly's 102 position relative to walls or other structures within its vicinity and calibrate the acoustic sensor (and/or other sensors 110) accordingly. Such calibrations can be utilized to, for example, compensate for echoes or other audio artifacts that could interfere with the detection of certain events. The audio artifacts can be compensated for by, for example, signal processing techniques executed onboard the sensor assembly 102 to reduce errors. In still other aspects wherein the sensor assembly 102 includes an ultrasonic sensor, the ultrasonic sensor can be utilized to emit sound waves in order to calibrate other sensor assemblies 102 that are within the detection distance. Such audio signals can be utilized to pair sensor assemblies 102 together and/or allow the sensing system 100 to determine the spatial orientation of the various sensor assemblies 102 relative to each other within an environment. In yet another aspect, wherein the sensor assembly includes a speaker, the sensor can output particular sound pattern (e.g., a frequency sweep tone from configurable low frequency values to high frequency values) and have either the microphone on the same sensor assembly 102, or a different sensor assembly 102 in the vicinity, detect the audio signal using a microphone sensor to actively measure and calibrate for the environment.

In one aspect, the sampling rate of each of the sensor assembly can be automatically varied according to the sensor 110 type or the property or phenomena being sensed. For example, the vibration sensor 138 could have a high sample rate and the temperature sensor 136 could have a low sample rate (because temperature generally changes relatively slowly). Varying the sampling rate according to the property being sensed by the sensors 110 allows data to be collected at the rate needed to capture environmental events, without unnecessary fidelity and the accompanying processing and transmission requirements. In an example, the temperature sensor 136, humidity sensor, ambient pressure sensor, light color and/or light intensity sensors 132, magnetic field sensor 134, electronic device sensor 140, infrared radiation sensor 130, and motion sensor 142 are each sampled at, for example, about 8 Hz to about 12 Hz, and preferably at about 9 Hz, 10 Hz, or 11 H; the vibration sensor 138 is sampled at, for example, about 3 kHz to about 5 kHz, and preferably at about 3.8 kHz, 3.9 kHz, 4 kHz, 4.1 kHz, or 4.2 kHz (e.g., each axis of a three-axis accelerometer is sampled at, for example, 8 kHz, 3.9 kHz, 4 kHz, 4.1 kHz, or 4.2 kHz); the acoustic sensor 144 is sampled at, for example, about 15 kHz to about 19 kHz, about 16 kHz to about 18 kHz, or at about 17 kHz; and the EMI sensor 146 is sampled at, for example, about 250 kHz to about 750 kHz, about 490 kHz to about 510 kHz, about 495 kHz to about 505 kHz, or at about 500 kHz. It should be noted when accelerometers are sampled at high speed, they can detect minute oscillatory vibrations propagating through structural elements in an environment (e.g., dry-wall, studs, and joists).

Figure 7:
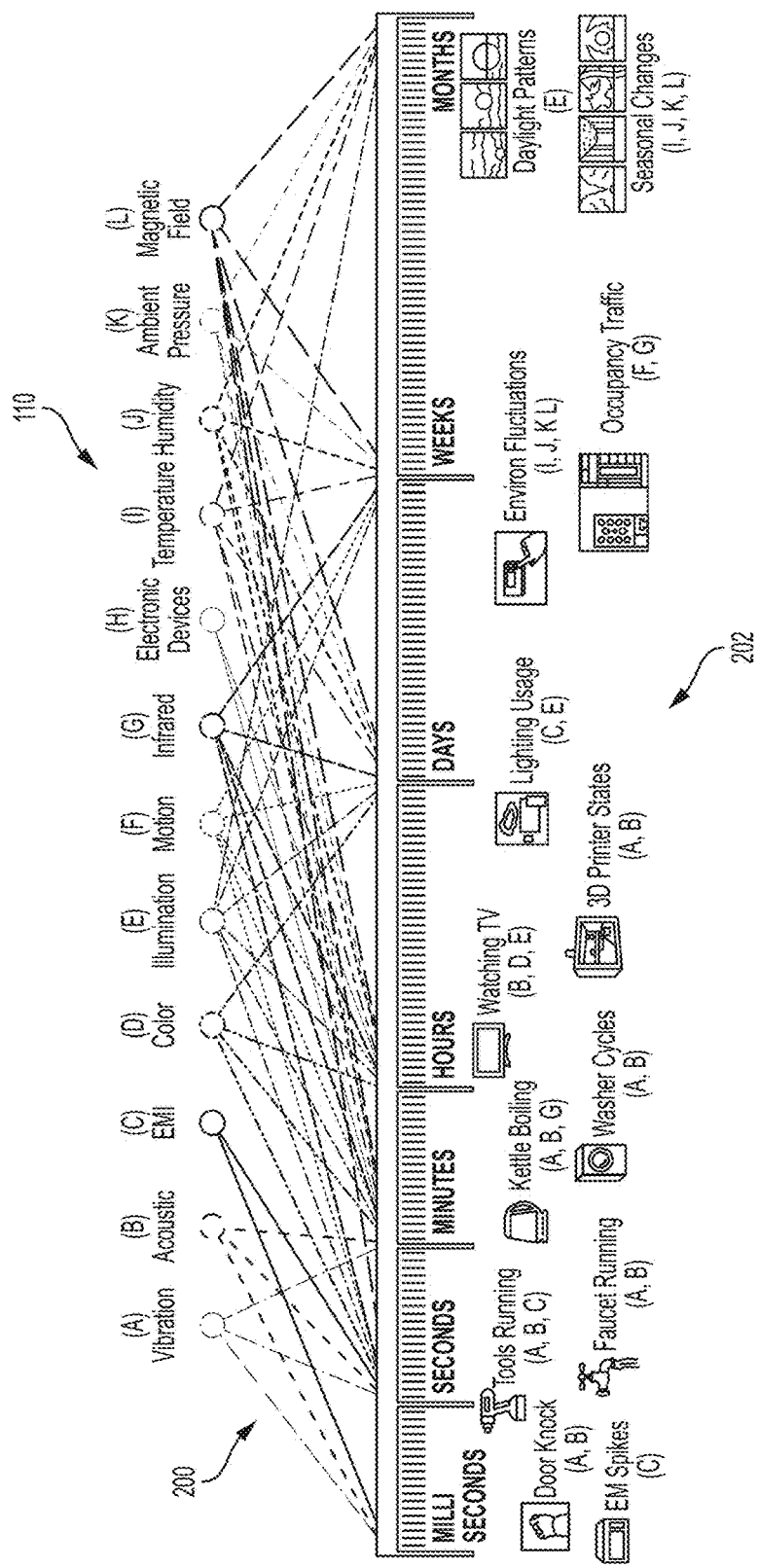
FIG. 7 illustrates a timeline of sampling rates for various sensors, in accordance with at least one aspect of the present disclosure.

FIG. 7 depicts a timeline 200 illustrating various illustrative data sampling timescales for a variety of sensors and the events detectable by various sensors 110 at those sampling rates. In this example illustration, the vibration sensor 138, acoustic sensor 144, and EMI sensor 146 can sample on timescales on the order of milliseconds to minutes; the light color sensor 132 can sample on the order of seconds to days; the illumination sensor 132 can sample on the order of seconds to months; the motion sensor 142 and the infrared sensor 130 can sample on the order of seconds to weeks; the electronic device sensor 140 can sample on the order to minutes; and the temperature sensor 136, the ambient pressure sensor, the humidity sensor, and the magnetic field sensor 134 can sample on the order of minutes to months. Sampling this array of sensors 110 at these rates allows the sensor assembly 102 to detect events 202 ranging from EMI spikes (e.g., from a microwave) via the EMI sensor 146, door knocks via the vibration and acoustic sensors 138, 144, and/or other events that occur on the order of milliseconds, to daylight changes via the ambient light sensor 132, seasonal changes via a variety of sensors, and/or other events that occur on the order of months. As depicted, a variety of other events such as tools running, light usage, and appliance usage can be detected at timescales between these extremes. Further, the data stream of each sensor 110 can be buffered (e.g., a rolling 256-point buffer) in case communication is lost with the computer system 104 or the sensor assembly 102 is otherwise unable to transmit data for a period of time. This buffered data can be stored on the internal memory of the microprocessor on the sensor assembly 102 or an external memory module connected to the sensor assembly 102. The sensor assembly 102 can be configured to resume sending the buffered data when communication resumes and can overwrite older sensor data to keep only the most recent samples if the memory space runs out.

Referring back to FIG. 5, the sensor assemblies 102 communicate with a computer system 104, such as a server, server system, or cloud-based computing architecture, that provides the back end computational analysis for the sensing system 100. Data can be processed at multiple stages in the sensing system 100, such as onboard the sensor assemblies 102, at the computer system 104, and/or at another computer system (e.g., a gateway that is part of the computer system 104). For example, in the aspects depicted in FIGS. 1A, 1B, 3A, and 3B the sensor assembly 102 performs onboard featurization of the sensor 110 data and the computer system 104 processes the data through a machine learning model. In some aspects, the sensing system 100 can be a distributed computing system, wherein computational resources can be dynamically shifted between the sensor assembly 102 and distributed computers/servers of the computer system 104. In one aspect, a central computer/server in the computer system 104 can control the amount of computational resources spent by each node in the distributed computing system 104. For example, the central computer/server can offload computational resources (e.g., for data featurization) to the sensor assembly 102 and/or an intermediate gateway if other servers/computers in the computer system 104 begins to slow or becomes over exerted, and vice versa.

The computer system 104 can be accessible via a client 106, such as a personal computer, laptop or mobile device, through a console user interface or a graphical user interface (GUI), such as a web browser or mobile app. When the client 106 connects to the computer system 104, the computer system 104 can permit the client to access the data from the sensor assemblies 102. In one aspect, the client 106 may only access the data registered to the user account through which the client 106 has accessed the computer system 104 or otherwise allow the user of the client 106 to access the data from the sensor assemblies 102 associated with the user. In one aspect, a user can visualize the featurized data transmitted from the sensor assembly 102 to the computer system 104 through the GUI. The GUI can provide spectrograms, line charts, and other graphical and/or numerical formats for viewing the received data. Further, sensor streams could be separated into time and frequency domain components. In one aspect, the GUI can be customized to visualize only a subset of the featurized sensor streams, as desired by the user. For example, FIGS. 7-13 depict various graphical formats in which the featurized data can be presented via a GUI on a client to a user. In another aspect, the GUI can be configured to automatically provide an alert when the data from one or more sensor channels exceeds a particular threshold, a particular event or condition is detected from the received data, and/or other rules programmed or otherwise specified by the user are satisfied. Further, the threshold(s) and/or other rules for providing an alert can be configurable via the GUI. In another aspect, the GUI can allow users to enable and disable particular sensor 110 streams from the sensor assembly 102 (i.e., cause the sensor assembly 102 to deactivate or stop sampling the particular sensor(s) 110), modify sampling frequencies of the sensor(s) 110, allow the user to permit other users to access the sensor data associated with his or her user account, and configure other features associated with the back end computer system 104. In yet another aspect, the interface can be configured to control whether some or part of the data featurization occurs onboard the sensor assembly 102, at an intermediate gateway between the sensor assembly 102 and the computer system 104, and/or at the computer system 104. In another aspect, the interface can be configured to assist a user in providing and/or verifying labels for raw data and/or featurized data, as discussed above.

In some aspects, the computer system 104 can further implement a management module that allows firmware and/or software updates to be transmitted to the sensor assemblies 102. This management module can be controlled via an interface of the client 106, e.g. the GUI. Further, the management module of the interface could allow custom code to be deployed at each sensor assembly 102, as desired by the user. Still further, the management module could collect and store telemetry information, such as uptime of the sensors 110 and/or sensor assembly 102, data rates for the sensors 110, reboots of the sensor assembly 102, and so on. The management module could further allow users to adjust the sampling rates of the sensors 110 of the sensors assemblies 102 (e.g., on a sensor-by-sensor basis and/or on a categorical basis across all of the sensor assemblies 102). Still further the management module can instruct the sensor assembly as to which features should be extracted for a particular and at what rate.

In order to assist in the understanding of the presently described sensing system, illustrative implementations of the sensing system will now be described. The following examples are intended for representative purpose only and should not be interpreted as limiting in any way.

Figure 8:
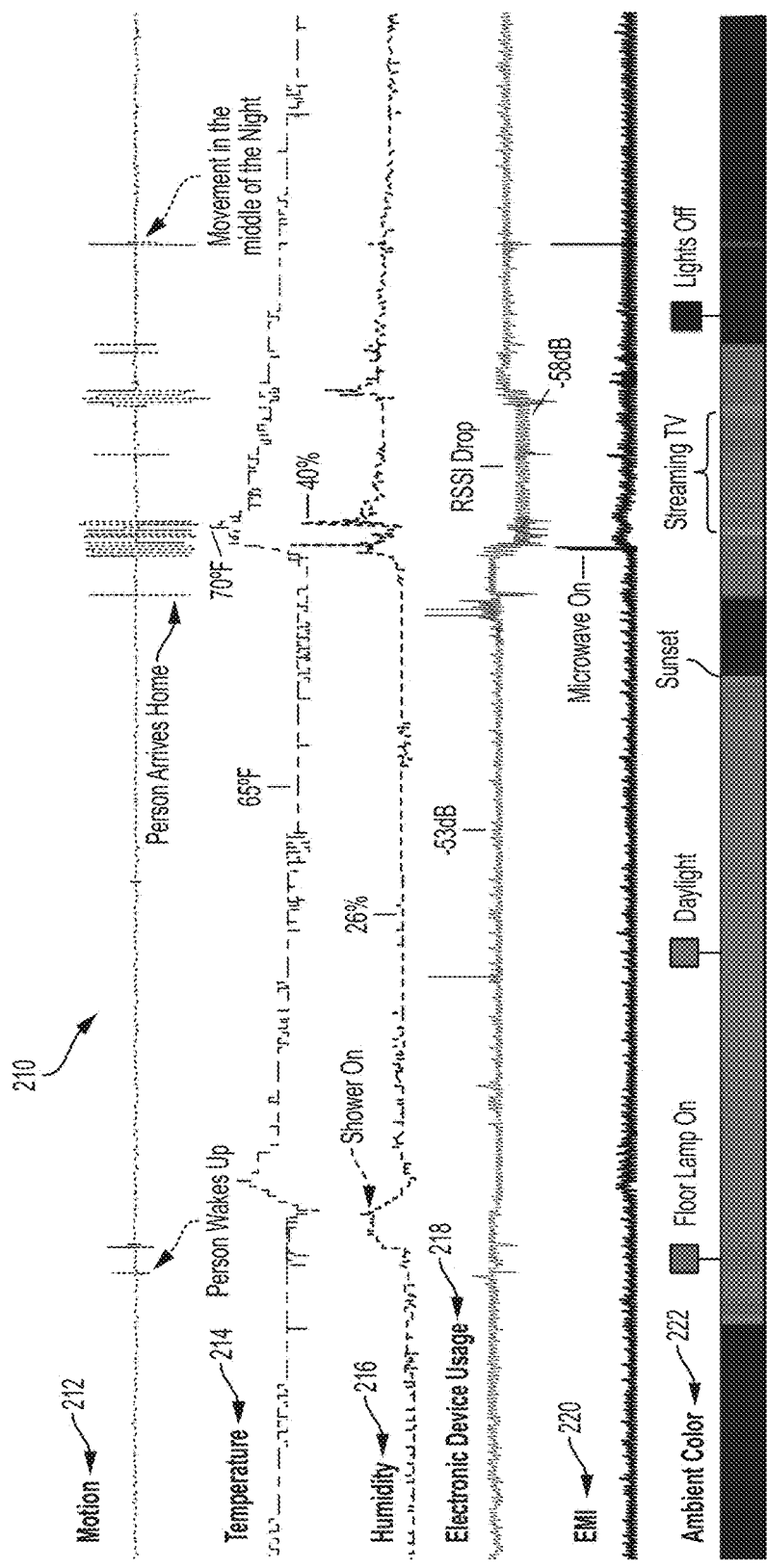
FIG. 8 illustrates a first sensor data graphical display annotated with events detected by the sensing system, in accordance with at least one aspect of the present disclosure.

FIG. 8 illustrates a first sensor data graphical display 210 annotated with events detected by the sensing system 100, in accordance with at least one aspect of the present disclosure. In one aspect, the sensor assembly 102 includes a motion sensor 142, a temperature sensor 136, a humidity sensor, an electronic device sensor 140, and EMI sensor 146, and an ambient light color sensor 132. The first sensor data graphical display 210 depicts the sensor data captured by a sensor assembly 102 placed within a studio apartment over the course of a 24-hour period. Based on the depicted sensor data, a variety of virtual sensors 116 could be trained to detect events correlated with the data captured by the sensor assembly 102.

For example, a virtual sensor 116 could be trained to detect when a person is awake according to a combination of the motion data 212 and the ambient light color data 222, which detect the movement of the occupant and the occupant turning on a lamp, respectively. As another example a virtual sensor 116 could be trained to detect when the occupant is showering according to the humidity data 216. As another example, a virtual sensor 116 could be trained to detect when the occupant is streaming TV according to variations in the ambient light color data 222 and the electronic device data 218, which in this case is a Wi-Fi sensor configured to detect when electronic devices are being utilized according to the Received Signal Strength Indicator (RSSI) of the Wi-Fi. As yet another example, a virtual sensor 116 could be trained to detect when the occupant has come home according to a combination of the motion data 212 and/or the temperature data 214 (wherein the rising temperature could result from the occupant increasing the thermostat when he or she comes home). As still yet another example, a virtual sensor 116 could be trained to detect when the microwave was being utilized according to the EMI data 220, which can detect the EMI spike from the microwave being activated.

Figure 9:
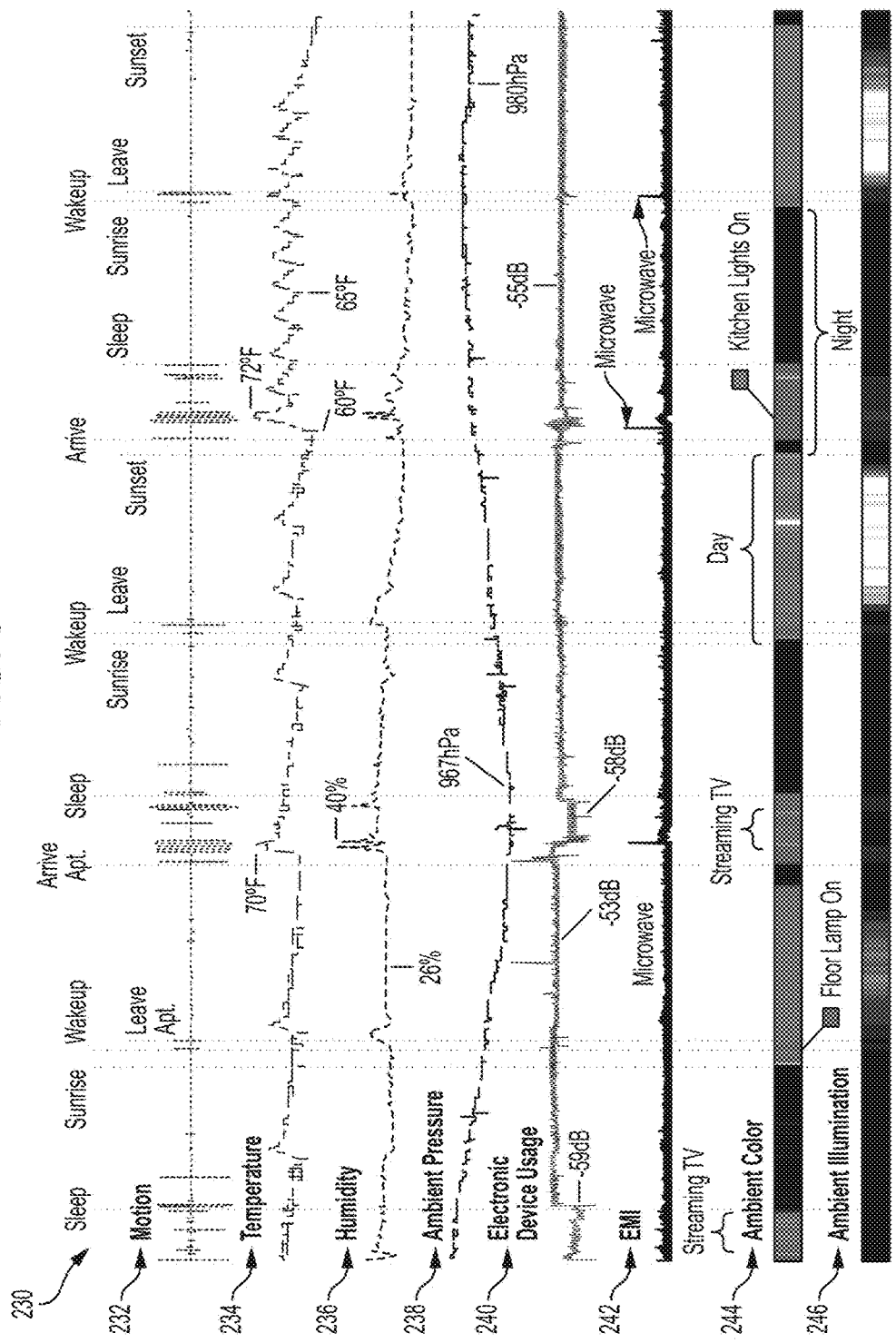
FIG. 9 illustrates a second sensor data graphical display annotated with events detected by the sensing system, in accordance with at least one aspect of the present disclosure.

FIG. 9 illustrates a second sensor data graphical display 230 annotated with events detected by the sensing system 100, in accordance with at least one aspect of the present disclosure. In one aspect, the sensor assembly 102 includes a motion sensor 142, a temperature sensor 136, a humidity sensor, an ambient pressure sensor, an electronic device sensor 140, and EMI sensor 146, and an ambient light color/illumination sensor 132. The second sensor data graphical display 230 depicts the sensor data captured by a sensor assembly 102 placed within an apartment over the course of a 72-hour period. Based on the depicted sensor data, a variety of virtual sensors 116 could be trained to detect events correlated with the data captured by the sensor assembly 102.

For example, a virtual sensor 116 could be trained to detect day and night cycles according to the ambient light color data 244 and ambient light illumination data 246. As another example, a virtual sensor 116 could be trained to detect when the occupant is present and active within the apartment according to some combination of the motion data 232, the ambient light color data 244 (because the ambient light color sensor 132 can detect when a lamp and the kitchen lights are on), and/or the temperature data 234 (because the motion data 232 correlates to a temperature increase). As another example, a virtual sensor 116 could be trained to detect when the microwave was being utilized according to the EMI data 220. As yet another example, a virtual sensor 116 could be trained to detect when the occupant is streaming TV according to variations in the ambient light color data 222 and the electronic device data 218. The humidity data 236 and the ambient pressure data 238 could be utilized to detect additional longer term environmental changes, such as the weather.

Figure 10:
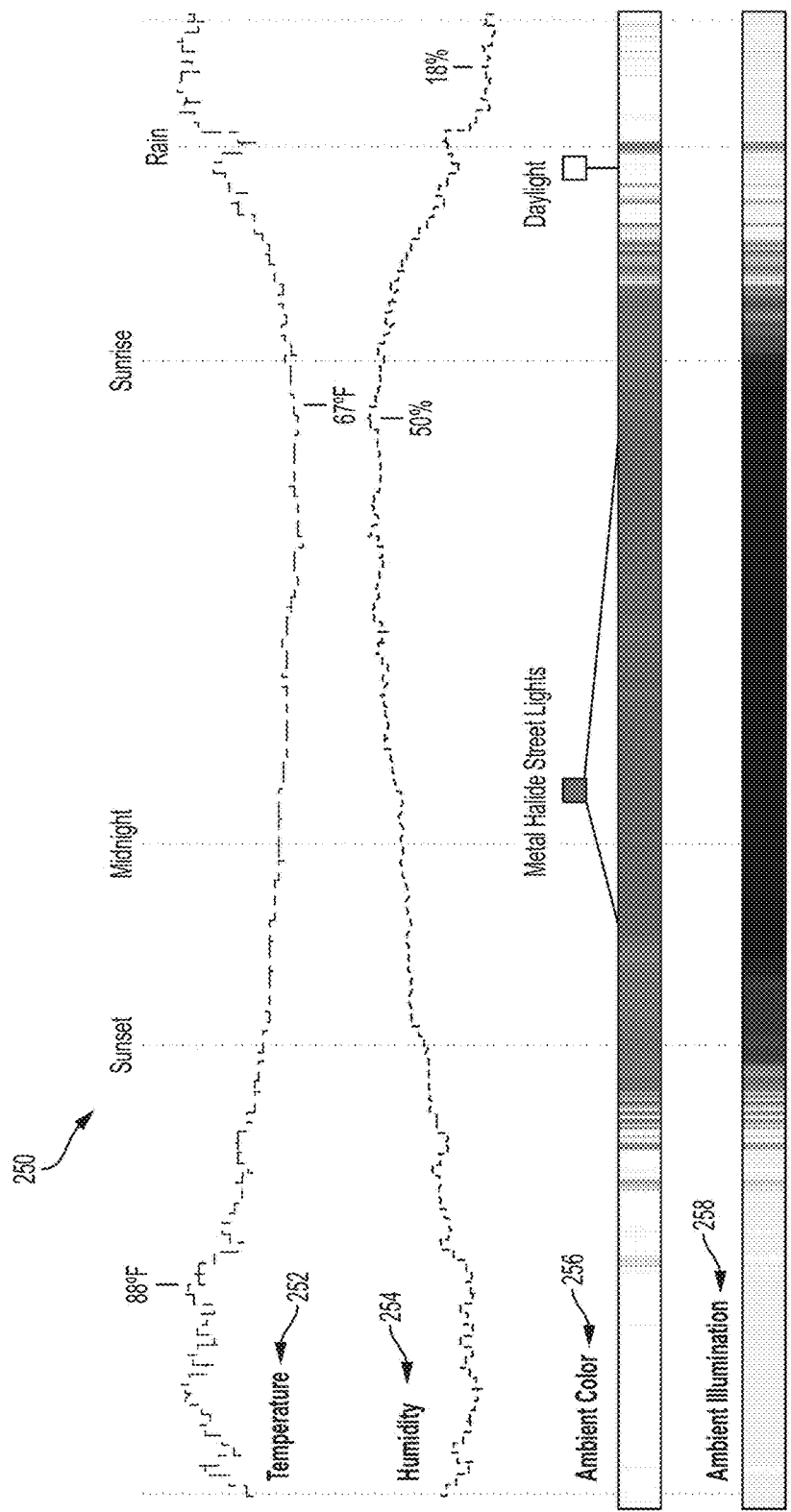
FIG. 10 illustrates a third sensor data graphical display annotated with events detected by the sensing system, in accordance with at least one aspect of the present disclosure.
Figure 11:
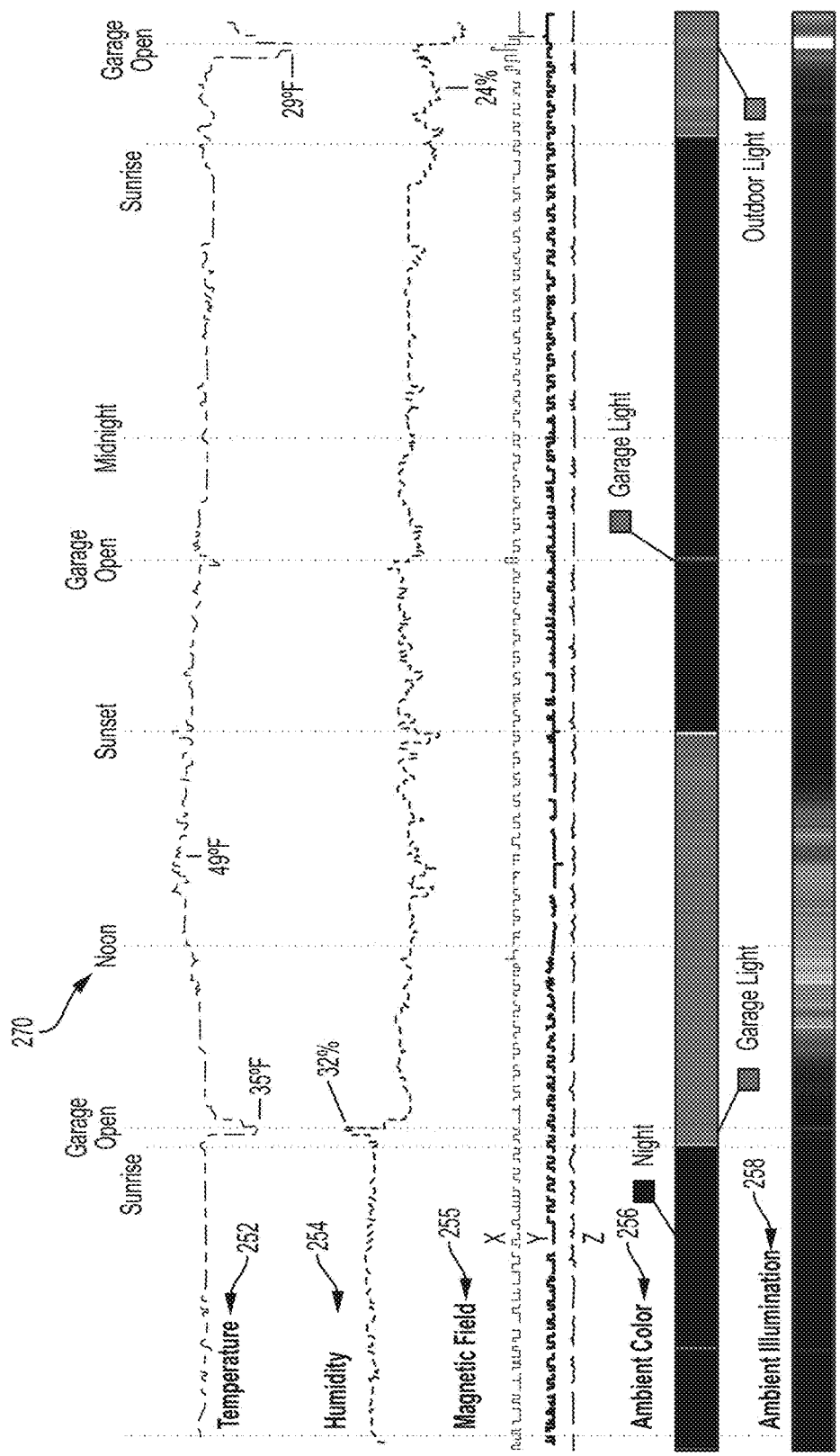
FIG. 11 illustrates a fourth sensor data graphical display annotated with events detected by the sensing system, in accordance with at least one aspect of the present disclosure.

FIGS. 10-11 illustrate a third sensor data graphical display 250 and a fourth sensor data graphical display 270 annotated with events detected by the sensing system 100, in accordance with at least one aspect of the present disclosure. In one aspect, the sensor assembly 102 includes a temperature sensor 136, a humidity sensor, a magnetic field sensor, and an ambient light color/illumination sensor 132. The third sensor data graphical display 250 and the fourth sensor data graphical display 270 each depict the sensor data captured by a sensor assembly 102 placed within a garage over the course of approximately a 24-hour period. Based on the depicted sensor data, a variety of virtual sensors 116 could be trained to detect events correlated with the data captured by the sensor assembly 102.

For example, a virtual sensor 116 could be trained to detect rain, as depicted in FIG. 10, according to the temperature data 252 and/or the humidity data 254 due to the fact that rain is correlated with a drop in the temperature and an increase in the humidity. As another example, a virtual sensor 116 could be trained to detect night time according to the ambient light color data 256 (which can detect the light from the street lights, as depicted in FIG. 10) and/or the ambient light illumination data 258. As yet another example, a virtual sensor 116 could be trained to detect when the garage door opens, as depicted in FIG. 11, according to the temperature data 252 and the humidity data 254, which drop and rise, respectively, when the garage door is opened during the winter. The magnetic field data 255 could be utilized to detect additional events or parameters, such as environmental changes or seasonal changes, as discussed above in the context of other examples.

It should be noted that sensor assemblies 102 with different combinations or arrangements of sensors 110 can be utilized for different applications or locations. For example, the sensor assemblies 102 described in connection with FIGS. 8-9 have a more expansive suite of sensors 110 because they are intended to be utilized in a domicile to track a wide array of behaviors and activities. Conversely, a sensor assembly 102 intended to be utilized in a location where there is less activity or less data that needs to be tracked (e.g., in a garage as with FIGS. 10-11) could have a more minimal suite of sensors 110.

Figure 12:
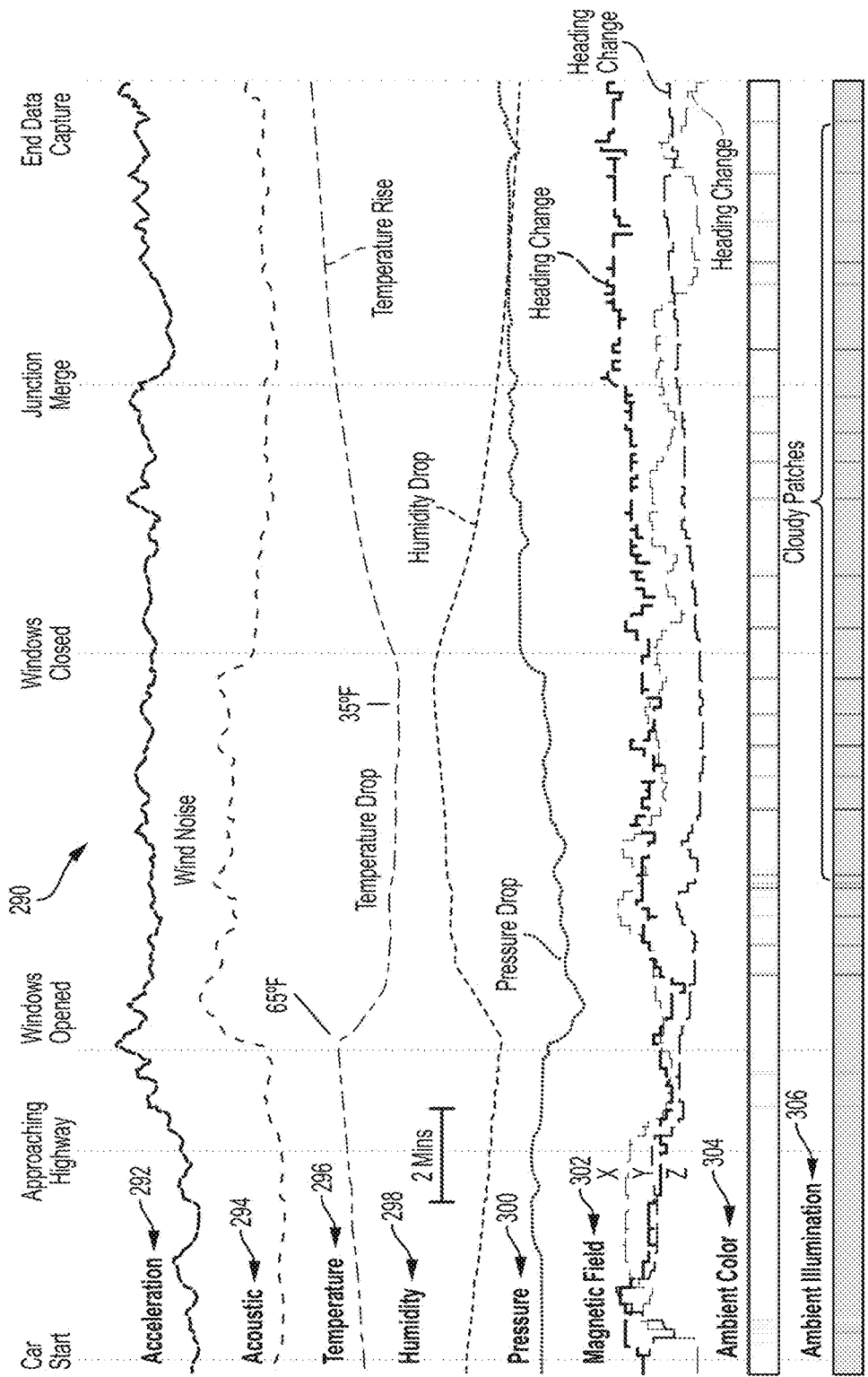
FIG. 12 illustrates a fifth sensor data graphical display annotated with events detected by the sensing system, in accordance with at least one aspect of the present disclosure.

FIG. 12 illustrates a fifth sensor data graphical display 290 annotated with events detected by the sensing system 100, in accordance with at least one aspect of the present disclosure. In one aspect, the sensor assembly 102 includes an acceleration sensor, an acoustic sensor 144, a temperature sensor 136, a humidity sensor, an ambient pressure sensor, a magnetic field sensor 134, and an ambient light color/illumination sensor 132. The fifth sensor data graphical display 290 depicts the sensor data captured by a sensor assembly 102 placed within an automobile over the course of trip. Based on the depicted sensor data, a variety of virtual sensors 116 could be trained to detect events correlated with the data captured by the sensor assembly 102. This particular example showcases how the sensor assembly102 can be utilized in a mobile setting, e.g. an automobile, to detect a variety of events by training different types of virtual sensors 116. This example also illustrates a sensor assembly 102 attached or coupled to an object (i.e., the automobile) being sensed. Thus, the sensing system 100 in this example represents a direct sensing system with respect to the object to which the sensor assembly 102 is attached (i.e., the automobile) and an indirect sensing system with respect to environment in which the sensor assembly 102 is located (i.e., the interior of the automobile).

For example, a virtual sensor 116 could be trained to detect when the automobile is approaching a highway according to the acceleration data 292, which indicates that the automobile has been gradually accelerating for an extended period of time. As another example, a virtual sensor 116 could be trained to detect when a window has been lowered according to some combination of the acoustic data 294 (which detects an increase in the amount of noise within the automobile), the temperature data 296 (which detects a temperature drop), the ambient humidity data 298 (which detects a humidity increase), and/or the ambient pressure data 300 (which detects a pressure drop). Further, a virtual sensor 116 could likewise be trained to detect when the window has been closed according to these same data streams. Additionally, a second order virtual sensor 124 could be trained from first order virtual sensors 120 to track the state of the automobile window. Instead of outputting a binary output as with the first order virtual sensors 120 (e.g., "Is the window closed? Yes or no?" or "Is the window open? Yes or no?"), the second order virtual sensor 124 could be trained from the outputs of the first order virtual sensors 120 to provide a nonbinary output directed to the window's state (e.g., "Is the window open, being opened, partially opened, closed, or being closed?") based on this data. As another example, a virtual sensor 116 could be trained to detect heading of the vehicle according to the magnetic field data 302. Similarly to the above example, the magnetic field data 302 could train a number of first order virtual sensors 120 (e.g., "Is this vehicle heading north?" or "Is the vehicle heading west?") and a second order virtual sensor 124 could be trained from the output of the first order virtual sensors 120 to provide a nonbinary output directed to the vehicle's state (e.g., "What direction is the vehicle heading in?"). As yet another example, a virtual sensor 116 could be trained to detect the degree of cloudiness according to the ambient light illumination data 306, which can indicate the number and length of the instances that the sun is obscured during the course of the vehicle's trip. The ambient light color data 304 could be utilized to detect additional events or parameters associated with the vehicle or the vehicle's environment, such as what time of day it is, as discussed above in the context of other examples, or whether the vehicle is proceeding through a tunnel.

Figure 13:
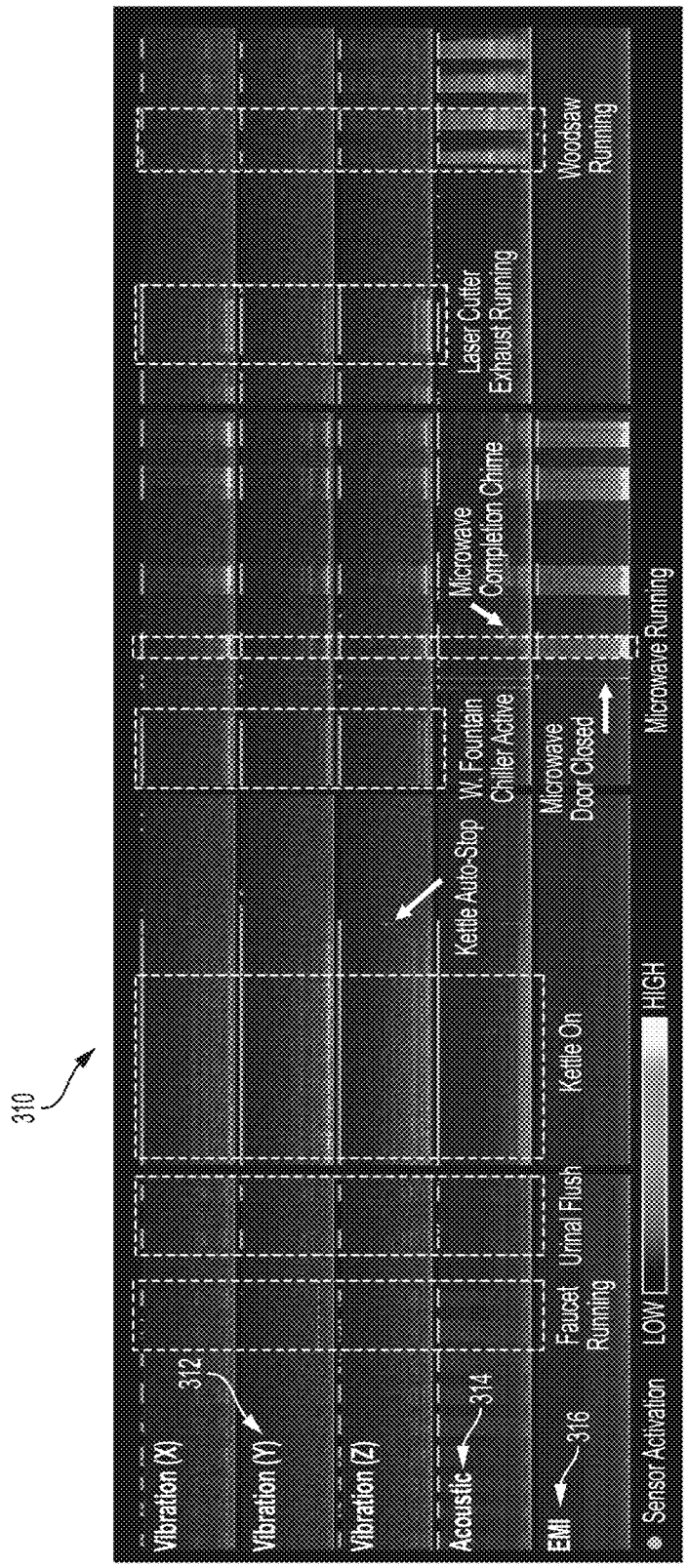
FIG. 13 illustrates a sixth sensor data graphical display annotated with events detected by the sensing system, in accordance with at least one aspect of the present disclosure.

FIG. 13 illustrates a sixth sensor data graphical display 310 annotated with events detected by the sensing system 100, in accordance with at least one aspect of the present disclosure. In the sixth sensor data graphical display 310, a subset of the sensor data streams are depicted as featurized spectrograms. While the figure illustrates a spectrogram, other display methods such as a user interface illustrating time domain data, frequency domain data, and/or both are within the scope of this disclosure. In one aspect, the sensor assembly 102 includes a vibration sensor 138, an acoustic sensor 144, and an EMI sensor 146. It should be noted that in this aspect, the data stream from the vibration sensor 138 is broken down into X-, Y-, and Z-axis constituent parts, which can be provided by a three-axis accelerometer, for example. The sixth sensor data graphical display 310 depicts the sensor data captured by a sensor assembly 102 placed within a workshop. Based on the depicted sensor data, a variety of virtual sensors 116 could be trained to detect events correlated with the data captured by the sensor assembly 102.

For example, a variety of virtual sensors 116 could be trained to detect when the faucet is running, a urinal has been flushed, a kettle has been put on the stove, and/or various tools are being utilized according to a combination of vibration data 312 and acoustic data 314. It should be noted that although certain events can be detected utilizing the same combinations of featurized data streams, they are nonetheless detectably discernible because the different events have different patterns or characteristics within the sensor data streams. The different patterns or characteristics exhibited in the data streams for the sensors 110 activated by each event can be utilized by the machine learning of the sensing system 100 to characterize that event to generate a virtual sensor 116 that can reliably identify future occurrences of the event. In these particular examples, a faucet running, a urinal flushing, an electric saw running, and the other annotated events each generate a unique signature in the vibration data 312 and/or the acoustic data 314 that can be characterized by the machine learning of the sensing system 100 to identify those events.

Figure 14:
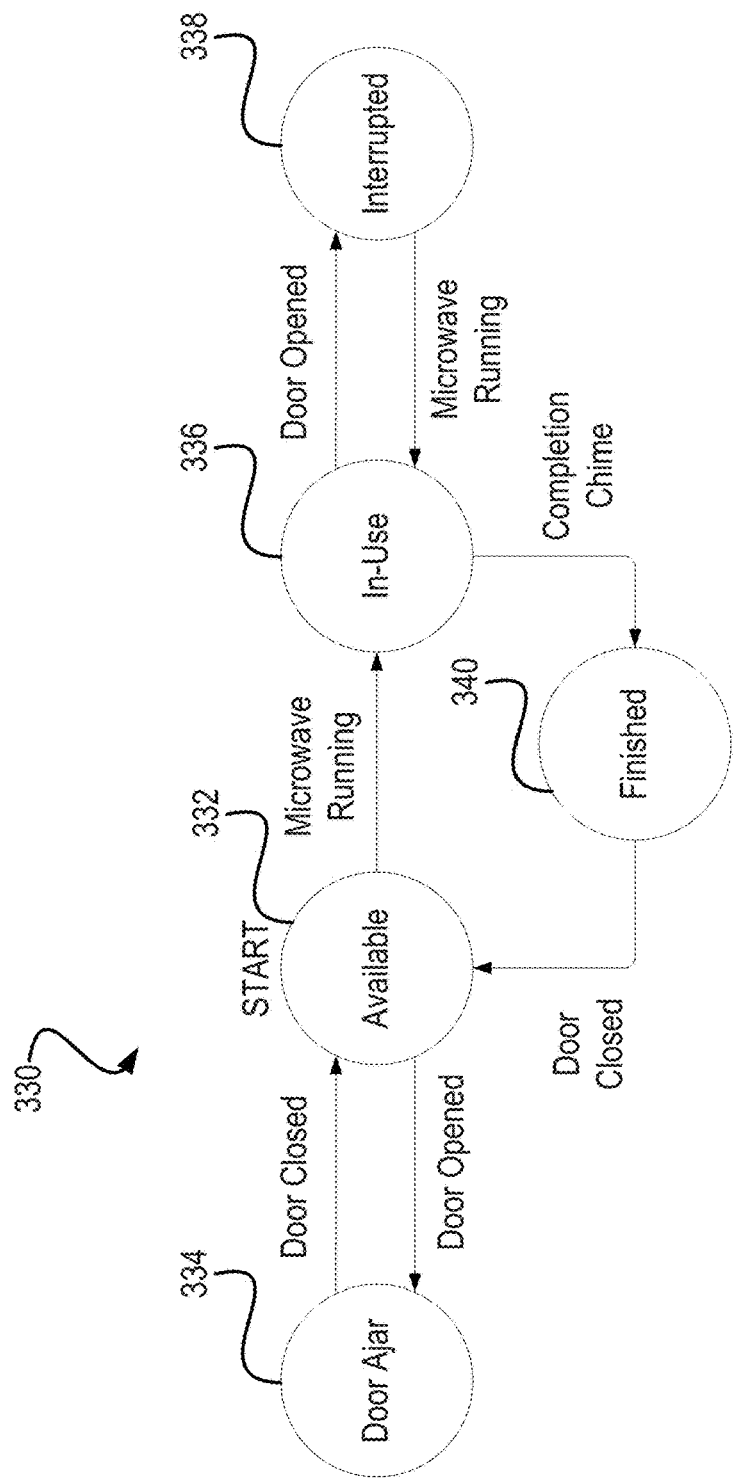
FIG. 14 illustrates a block diagram of a microwave second order virtual sensor represented as a state machine, in accordance with at least one aspect of the present disclosure.

As another example, a virtual sensor 116 could be trained to detect when the microwave door is opened or closed according to the acoustic data 314. Further, a virtual sensor 116 could be trained to detect when the microwave has completed a heating cycle according to the acoustic data 314 (by detecting the microwave's completion chime). Further, a virtual sensor 116 could be trained to detect when the microwave is running according to the EMI data 316. These virtual sensors 116 can represent first order virtual sensors 120 detecting binary properties of the microwave. The outputs of these first order virtual sensors 120 can be fed into a second order virtual sensor 124 trained to track the state of the microwave. FIG. 14, for example, illustrates a block diagram of a microwave second order virtual sensor 330 represented as a state machine, in accordance with at least one aspect of the present disclosure. The microwave second order virtual sensor 330 includes five states: available for use 332, door ajar 334, in-use 336, interrupted 338, and finished 340. The microwave second order virtual sensor 330 moves from the available state 332 to the door ajar state 334 and back again if acoustic data 314 indicates that the door has been opened and then closed. The microwave second order virtual sensor 330 moves from the available state 332 to the in-use state 336 when the EMI data 316 indicates that the microwave is running. The microwave second order virtual sensor 330 moves from the in-use state 336 to the interrupted state 338 when the acoustic data 314 indicates that the door has been opened. The microwave second order virtual sensor 330 moves from the interrupted state 338 back to the in-use state 336 when the EMI data 316 indicates that the microwave is once again running. The microwave second order virtual sensor 330 moves from the in-use state 336 to the finished state 340 when the acoustic data 314 indicates that the completion chime has sounded. The microwave second order virtual sensor 330 then moves from the finished state 340 to the available state 332 when the acoustic data 314 indicates that the microwave door has been closed (thereby indicating that the user has removed his or her food from the microwave). The state that the microwave second order virtual sensor 330 is in dictates its output. As can be seen from this example, a second order virtual sensor 124 can produce a nonbinary output by being trained on and fed a number of first order virtual sensors 120 that detect binary outputs, such as "Has the microwave door been closed?" or "Is the microwave running?".

Referring back to FIG. 5, the sensing system 100 can implement, in various embodiments, end-to-end encryption between the sensor assembly 102 and the computer system 104 to ensure confidentiality and authenticity of the data. In one aspect, the sensor assemblies 102 and the computer system 104 mutually authenticate themselves using asymmetric keys. For example, the sensor assembly 102 can authenticate that it is talking to the correct computer system 104 (e.g., specified by a hostname/IP) and then encrypt the data that it is transmitting to the computer system 104 so that only the computer system 104 can decrypt it. Similarly, the computer system 104 can authenticate the sensor assembly 102 by the sensor assembly 102 adding its public signature to the computer system 104 and the sensor assembly 102 signing any data item it sends to the computer system 104 with its own associated private key so that the computer system 104 can verify its authenticity. As another example, the sensing system 100 can utilize asymmetric key cryptography to establish the communication channel between each sensor assembly 102 and the computer system 104 and then establish a symmetric key cryptographic channel thereafter. Since the sensor assemblies 102 initiate the outgoing transmission protocol (e.g., TCP or UDP) to connect to a known server, they can punch a hole through a network address translation (NAT) or firewall and thus be deployed at homes with a single public IP address, as well as enterprises with each sensor assembly 102 having its own public address. All data communication between the sensor assembly 102 and the computer system 104 can occur over such a single, persistent, encrypted TCP socket. Further, each data packet transmitted by the sensor assembly 102 can contain a header denoting the sensor channels payload, allowing the computer system 104 to demultiplex the source and type of sensed data. Further, the sensor assembly 102 can implement appropriate serializing and deserializing routines to package the data into chunks for transmission via, e.g., a Wi-Fi connection. Finally, data send routines execute asynchronously by the sensor assembly 102 so that sensor data reading, featurization, and transmission can proceed independently.

In one aspect, the sensor assemblies 102 can transmit or stream the sensor data to a local computer or a computer external to the computer system 104. In one aspect, the local computer can include a client 106 that is capable of executing the interface for visualizing the data from the sensor assemblies 102 and/or controlling the functions of the sensor assemblies 102, as described above. In another aspect, the local computer can be executing the machine learning module 116, as described above. The local computer to which the data is streamed can be, for example, behind a system configured to perform network address translation (NAT), common in residential settings with a single public IP address shared by many computers. In this way, the data streams from the sensor assemblies 102 do not necessarily need to be transmitted all the way to the computer system 104 and then back to the interface for visualization on the client 106 and/or the machine learning module 116 for processing of the featurized data. In one aspect, the computer system 104 can control whether the sensor assemblies 102 are streaming data to a local computer according to whether there is a substantial distance between the sensor assemblies 102 and the computer system 104, whether the communication roundtrip time exceeds a particular threshold, or whether the available bandwidth falls below a particular threshold. In another aspect, a user can control whether the data from the sensor assemblies 102 is streamed to a local computer via the interface described above. In one aspect, the sensor assemblies 102 could also be programmed to automatically locate the nearest server (e.g., of the computer system 104) to which to stream its data based on a variety of metrics, such as distance, roundtrip communication time, and/or bandwidth.

Users can access or log into the computer system 104 via a client 106 to view the data from the sensor assemblies 102 associated with their user account, modify features or settings of the sensor assemblies 102, and update their security preferences. In one aspect, users can selectively permit other users to view, access, and/or modify their associated sensor assemblies 102. This could permit, for example, all family members to view the data and events detected by the sensor assemblies 102 within the family's home. The permissions provided to the invited users can be controlled from a master account, for example.

In various aspects, in order to properly capture, model, and classify events in an environment, sensor streams from the sensors 110 within a single sensor assembly 102 and the sensors 110 across multiple sensors assemblies 102 within the environment are preferably temporally correlated and/or synchronized. For example, a "door closing" event typically causes a synchronous increase in air pressure and a structural vibration, which could be detected across a number of sensor assemblies 102 located throughout the building. This co-occurrence of signals that are detectable with different sensors 110 and across different sensor assemblies 102 is what enables the virtual sensors 116 to robustly detect and classify events, such as a door closing in the above example. Even a minor temporal decorrelation between sensors 110 and/or sensor assemblies 102 could reduce the segmentation confidence of the classifier (i.e., virtual sensor 116). In one aspect, the sensing system 100 can be configured to temporally synchronize or correlate the data streams from sensors 110 both within a single sensor assembly 102 and across multiple sensor assemblies 102 to allow events detected by different data streams to be temporally associated together.

In one aspect, the computer system 104 utilizes a Network Time Protocol (NTP) to synchronize its own clock periodically, which is then used to keep all of the clocks 127 of all of the sensors assemblies 102 connected to the computer system 104 in synchronization with the computer system 104. Each sensor assembly 102 can include, for example, a quartz clock to keep track of time between these time synchronizations to minimize any clock drift between the different sensor assemblies 102. The sensor assembly 102 timestamps all sensor data with the system epoch time from its synchronized clock 127 to, e.g., millisecond granularity. Further, synchronizing the sensor assemblies 102 and timestamping all sensor data addresses any reordering problems from the sensors 110 being sampled asynchronously and any processing or transmission delays before the data packet reaches the computer system 104.

In one aspect, all data for each sensor stream is continuously buffered in an onboard buffer (e.g., a buffer onboard the sensor assembly 102), with each sensor reading timestamped according to the clock 127 synchronized across the sensing system 100 network. If communication between the sensor assembly 102 and the computer system 104 is lost or congested, the sensor assembly 102 can continually attempt to re-establish a communication channel with the computer system 104. The system firmware 129A of the sensor assembly 102 can be configured to periodically check for Wi-Fi connectivity and an active connection to the computer system 104 (or a server or other computer thereof). If the system firmware 129A determines that the communication channel is lost or congested, the sensor assembly 102 can execute an exponential back-off algorithm to periodically attempt to reconnect to the communications channel (e.g., Wi-Fi network). If the sensor assembly 102 is unable to reconnect to the computer system 104 for a particular length of time (e.g., one hour), the system firmware 129A can be configured to reboot and then once again attempt to reconnect to the computer system 104. Upon the sensor assembly 102 reconnecting to the computer system 104, the sensor assembly 102 can then upload all of the buffered, time-stamped sensor data to the computer system 104, which can then reorganize the data with the data from other sensor assemblies 102 as necessary.

In one aspect, the sensor assembly 102 comprises a software watchdog to monitor the status of all of the sensors 110. If any sensor 110 does not report new data within a configurable period (e.g., 60 seconds), the software watchdog executed by the system firmware 129A can automatically restart the sensor assembly 102. In another aspect, the sensor assembly 102 comprises a hardware watchdog that reboots the sensor assembly 102 if the application or the system firmware 129A fails to respond in a timely manner (e.g., within one minute). After reset, the sensor assembly 102 re-initializes all the sensors 110 and resumes operation.

In one aspect, the sensor assembly 102 can further include one or more output devices, such as a light emitting device assembly including one or more LEDs, microphones, vibration motors, displays, and other audio, visual, and/or haptic indicators (not shown here). The output devices can be utilized to provide alerts or feedback to the user when various events occur. For example, the sensor assembly 102 can cause an LED assembly to illuminate or flash, a vibration motor to vibrate, a speaker to emit an audible alert, or the like when, for example, a particular event has been detected. The computer system 104 can detect the occurrence of the event via an appropriate virtual sensor 118 and then transmit a command or signal to the sensor assembly 102 to cause the corresponding output device to provide feedback, as previously described. Such audible or visual feedback can be utilized to provide notifications to hearing or vision-impaired individuals that an event has occurred (e.g., a kettle is boiling) or otherwise alert users that an event that the user may wish to be aware of has occurred. These alerts can be configured via the interface, for example. Users can thus access the computer system 104 via a client 106 and then program or configure the desired alerts in accordance with virtual sensors 118 and/or the trigger action rules described above. In yet another aspect, the sensor assembly 102 can include a wireless communication circuit (e.g., a Bluetooth LE transmitter, WiFi, Zigbee, Z-Wave) for transmitting alerts (e.g., push notifications) to the user (e.g., the client 106) when a selected event has been detected.

In aspects where the sensor assembly 102 includes one or more output devices, the output devices can also be utilized to confirm or authenticate the identity and/or location of particular sensor assemblies 102. For example, a user visualizing the data streams from a number of sensor assemblies 102 within a sensing system 100 can (e.g., via a client device 106) cause the output device of a particular sensor assembly 102 to begin emitting an alert so that the user can confirm the identity and location of the sensor assemblies 102. For example, a user could select "sensor assembly #3" and cause it to emit an alert. Thereafter, the computer system 104 can transmit a command to the sensor assembly 102 corresponding in identity to "sensor assembly #3" to cause it to emit a sequence of flashes by the light source or a sequence of beeps from the speaker. The user can then enter the sequence into the client device 106 to authenticate the client device 106 to the sensor assembly 102. In various aspects, the output may also be provided to a user mobile device.

In aspects wherein the sensor assembly 102 includes a wireless communication circuit (e.g., Wi-Fi, Bluetooth, radio frequency identification, or the like), the sensing system 100 can authenticate a user based upon their mobile electronic devices (e.g., smart phone, wearables, and other such devices). For example, the sensing system 100 can utilize the wireless communication circuit to determine whether human activity detected by the sensor assemblies 102 is being performed by a user of interest, based upon whether the wireless communication circuit is able to detect the mobile electronic devices of the user or other authorized individuals present within the vicinity of the relevant sensor assemblies 102. The mobile electronic devices of the user and/or other authorized individuals can be, for example, pre-registered with the sensing system 100 or pre-paired with the sensor assemblies 102. Various applications and/or trigger rules could then be programmed to send alerts to an authorized user and/or take other actions if human activity detected by the sensing system 100 at certain locations, at certain times, or according to other such constraints, is not being performed by the users of interest. Such aspects could be utilized to, for example, detect when an unauthorized individual is in the user's home at night or while the user is at work. Such aspects could also be utilized to, for example, confirm the identity of an individual making changes to the configurations or settings of the sensing system 100 via a client 106 according to their proximity to a sensor assembly 102 of the sensing system 100.

In addition to utilizing machine learning to train virtual sensors 116 to automatically characterize and detect various events within the detection range of each sensor assembly 102, a client 106 can also be utilized to access the computer system 104 to define conditions (rules) and associated actions to take in response to those conditions via an interface. In other words, users can program explicit actions for the sensor assembly 102 and/or computer system 104 to take when certain conditions have been satisfied. For example, a user could define a condition where if the motion sensor 142 is triggered and the time is after midnight, then send a text message to a particular cellular number. The trigger action rules can be defined with multiple conditions (triggers) and multiple actions. Triggers may capture specific conditions on sensor values (e.g., temperature >20° C.) or demonstrated behaviors detected by a virtual sensor 116 (e.g., window is open). Both sensors and actions can either refer to specific devices (e.g., temperature on sensor assembly #25) or to locations (e.g., kitchen). For instances where a trigger and/or action is specified to a location, the computer system 104 can compute the average value of all of the sensor assemblies 102 from a given sensor channel (e.g., temperature) for that specific location (e.g., kitchen).

In one aspect, the virtual sensors 118 can output data in a format that is consistent with one or more known API architectures, such as Representational State Transfer (REST) or publish-subscribe APIs. Such outputs formats can utilize appropriate authentication, access control primitives, and other controls. Outputting data from the virtual sensors 118 in accordance with a known API can allow apps to seamlessly make use of wide variety of data (whether it be raw sensor data, featurized sensor data, or higher order inferences) generated by the sensing system 100.

Figure 16:
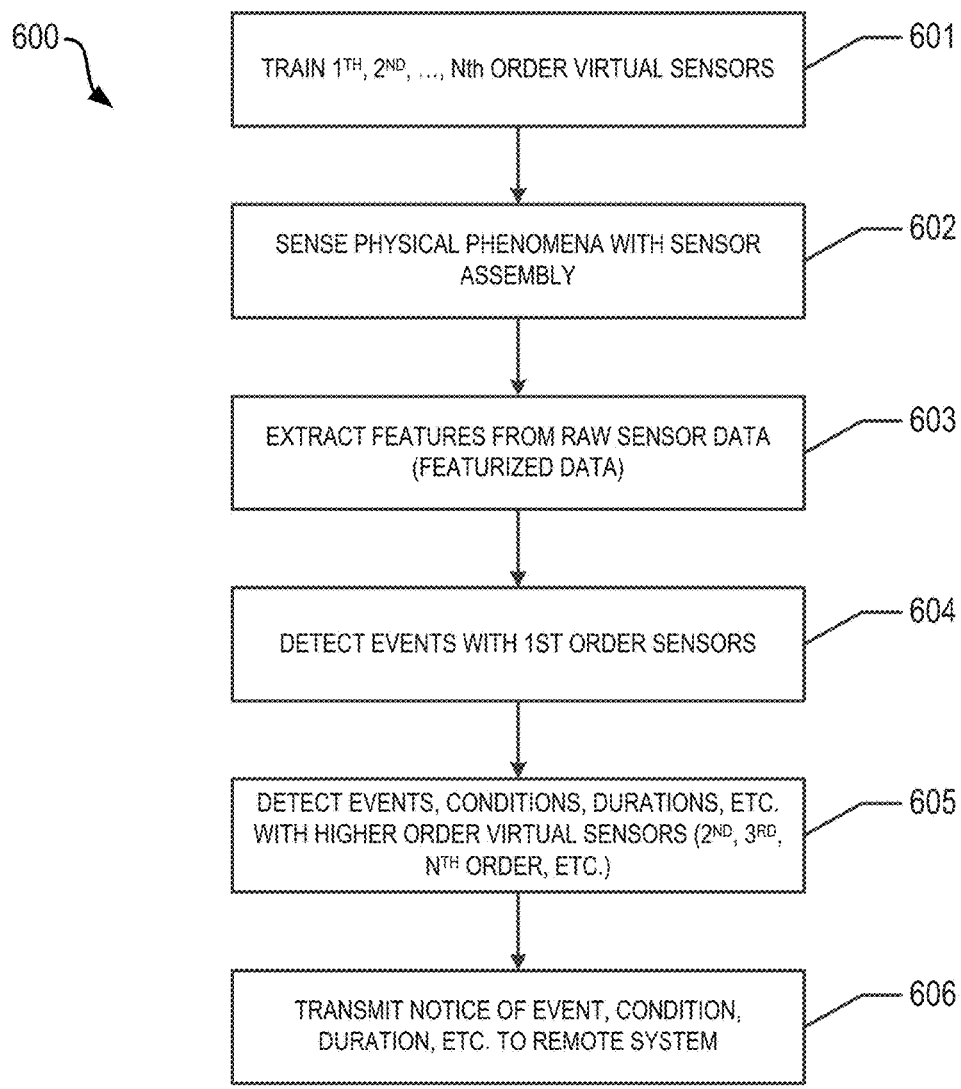
FIG. 16 illustrates a logic flow diagram of a process of detecting events via virtual sensors, in accordance with at least one aspect of the present disclosure.

FIG. 16 illustrates a logic flow diagram of a process 600 of detecting events via virtual sensors 118, in accordance with at least one aspect of the present disclosure. Various additional details regarding the steps of the process 600 are described in more detail above. At step 601, the first and/or higher order virtual sensors 118 of the sensing system 100 are trained. As mentioned herein, training of the virtual sensors 118 may involve training the virtual sensors 118 with annotated training examples. Next, in operation, at step 602 the various sensors 110 of the sensor assembly 102 sense physical phenomena in the environment of the sensor assembly 102. Next, at step 603, features from the raw sensor data are extracted, as described above. The featurization of the sensor data can be performed, for example, by the sensor assembly 102 (e.g., the microcontroller 121 thereof executing the featurization module 112), by the computer system 104 (e.g., by a programmed server thereof executing the featurization module 112), or by both components in a distributed manner. As described above, the sensor assembly 102 could transmit the featurized data in encrypted, periodic data packets, where the data packets might have concatenated sensor data from multiple sensors 110. Next, at step 604, one or more first order sensors 120 may detect occurrences of events that they are trained to detect at step 601 based on the featurized raw sensor data. For aspects of the sensing system 100 with higher order virtual sensors (e.g., 2nd, 3rd, . . . , Nth order virtual sensors), at step 605, the higher order virtual sensors can detect the events, conditions, durations, etc. that they are trained to detect. Next, at step 606, the back-end server system 104 can transmit data about the detections by the virtual sensors to a remote system via a data communication network via wired and/or wireless communication links. For example, as explained above, the computer system 104 could transmit detection of virtual events to the sensor assembly 102 so that the sensor assembly could trigger an output device (e.g., a light source or speaker) or transmit a notification to a user device (e.g., a user's smartphone, laptop, tablet, etc.). Also, the computer system 104 could transmit a notification directly to the user device or to another networked, computer-based system, such as an alarm or emergency response system, an ordering system, a log, a monitoring system, etc.

While the process 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 16, but the process may be integrated and/or one or more steps may be performed together, or the steps may be performed in the order disclosed or in an alternate order. For example, higher-order virtual sensors could be trained (e.g., step 601) after lower-order virtual sensors start detecting their associated events, conditions, durations, etc. In that connection, the times for performance of the steps illustrated in Figure N are not necessarily discrete, but instead can be ongoing continuous. That is, for example, the training of the virtual sensors 118 may be ongoing. Similarly, steps 602-606 can be performed continuously.

Figure 17:
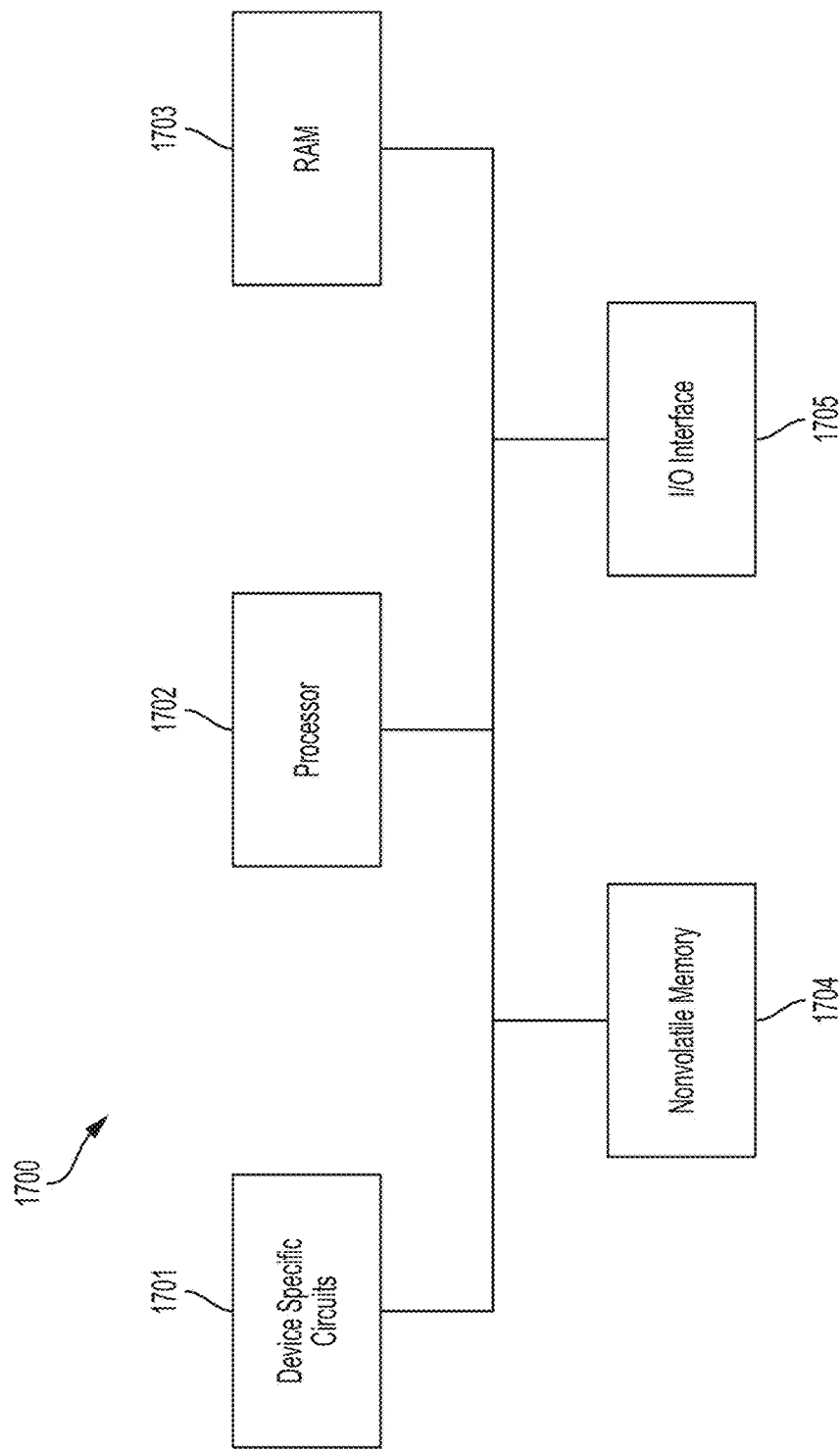
FIG. 17 illustrates a block diagram of a general computing or data processing system, in accordance with at least one aspect of the present disclosure.

A computing or data processing system 1700 suitable for storing and/or executing program code may take many forms and in one embodiment may include at least one processor 1702, which may be or be part of a controller, coupled directly or indirectly to memory devices or elements through a system bus, as shown in FIG. 17. Computing system 1700 in FIG. 17 is shown with a processor 1702, random access memory (RAM) 1703, nonvolatile memory 1704, device specific circuits 1701, and I/O interface 1705. Alternatively, the RAM 1703 and/or nonvolatile memory 1704 may be contained in the processor 1702 as could the device specific circuits 1701 and I/O interface 1705. The processor 1702 may comprise, for example, an off-the-shelf microprocessor, custom processor, FPGA, ASIC, discrete logic, etc., or generally any device for executing instructions. The RAM 1703 is typically used to hold variable data, stack data, executable instructions, etc., and may include dynamic random access memory (DRAM). Such a computing system 1700 may be used as one of the servers of the computer system 104, as a user device (e.g., mobile device), a remote computing system that receives notifications from the virtual sensors 118, etc.

According to various approaches, the nonvolatile memory 1704 may comprise any type of nonvolatile memory such as, but not limited to, electrically erasable programmable read only memory (EEPROM), flash programmable read only memory (PROM), battery backup RAM, hard disk drives, etc. The nonvolatile memory 1704 is typically used to hold the executable firmware and any nonvolatile data containing programming instructions that can be executed to cause the processor 102 to perform certain functions.

In some embodiments, the I/O interface 1705 may include a communication interface that allows the processor 1702 to communicate with devices external to the controller. Examples of the communication interface may comprise, but are not limited to, serial interfaces such as RS-232, Universal Serial Bus (USB), Small Computer Systems Interface (SCSI), RS-422, or a wireless communication interface such as Wi-Fi, Bluetooth, near-field communication (NFC) or other wireless interfaces. The computing system 1700 may communicate with an external device via the communication interface 1705 in any communication protocol such as Automation/Drive Interface (ADI).

The sensing system 100 described herein can be utilized in a number of different contexts. For example, the sensing system 100 can be utilized to assist in monitoring patients and providing effective healthcare to patients. Wth a rapidly aging population, providing care at home for this population will become a necessity. A key aspect that caregivers need is to track the Activities of Daily Living (ADL) for people, and be able to detect anomalies when these activities deviate from the norm for each individual. The sensing system 100 including virtual sensors 118, as described herein, can be used to provide a comprehensive system to track ADLs, such as bathroom usage, movement within the house, daily chores like cooking and eating, adherence to medications, detecting falls, all without needing instrumentation and intrusive sensing. In the future, virtual sensors to track various contexts within a person's home can be also used for predictive interventions (e.g. predict an impending fall), and not just for reactive events, particularly by customizing them to each individual.

As another example, the sensing system 100 can be utilized in industrial settings. In industrial settings with mechanical and electrical machinery, preventative maintenance and predictive analytics can be of huge help to increase equipment lifetime, as well as reduce downtime due to failures. Most older equipment does not have any sensing capability and newer equipment may have limited purpose specific sensing. The sensing system 100 including virtual sensors 118, as described herein, can be utilized to learn different states of industrial equipment by training a variety of virtual sensors 118 and then building applications and notifications to help with usage tracking, tracking error conditions, scheduling maintenance operations automatically, and other such tasks.

As another example, the sensing system 100 can be utilized in environmental sustainability efforts. Over two-thirds of the electricity generated in the US and over 30% of the potable water is used by human occupants of buildings, both commercial and residential. tracking resource usage, i.e. water and energy, at a fine granularity and notifying human occupants as well as building managers of wastage can lead to significant reduction in the usage of these natural resources. The sensing system 100 including virtual sensors 118, as described herein, can be utilized to train a variety of virtual sensors 118 in home and buildings to track individual appliance usage and water consumption and correspondingly provide comprehensive user interfaces and notifications to promote behavioral changes.

As another example, the sensing system 100 can be utilized for managing facilities. Given that humans spent over one third of their lives inside a commercial building (i.e., their work place), methods to make them more performative to serve occupant need can lead to improved productivity, comfort, and happiness. While sensing systems do get deployed in modern buildings for heating, ventilation, air-conditioning (HVAC), and lighting management, they are all purpose-specific, costly to deploy and maintain, and not easy to repurpose. The sensing system 100 including virtual sensors 118, as described herein, can be utilized to provide a uniform sensing substrate for all things related to smart building management, including control of HVAC systems, space utilization, power consumption tracking, occupancy and people movement tracking, fault detection, etc.

As another example, the sensing system 100 can be utilized for home-based consumer applications. Wth the advent of the IoT and integration with voice assistants, such as Amazon Alexa and Google Home, the presently described sensing system 100 can be utilized in a number of different ways as part of a "smart home." For example, the sensing system 100 can implement virtual sensors 118 to track the usage of consumables like toilet paper and soap to notify users when they are running low (or even directly order replenishments) or notify users about the status of appliances in the home (e.g., a dishwasher or laundry machine). The sensing system 100 can also implement virtual sensors 118 trained to detect meta events, such as any movements or sounds within the home, for security purposes. The sensing system 100 can also implement virtual sensors 118 trained to non-intrusively detect sleep duration and patterns, without the user(s) being required to wear any device(s).

As another example, the sensing system 100 can be utilized in a variety of implementations for smart cities. There is a major push across the US and the globe to make cities smarter by adding sensing to street lights and other public infrastructure, such as buses, trolleys, and roads. The sensing system 100 including virtual sensors 118, as described herein and suitably outfitted for outdoor environments, can sense a wide variety of facets of the city environment. In addition, a number of virtual sensors 118 can be trained to detect events of interest that have distinct signatures. For example, virtual sensors 118 can sense a traffic jam, an accident, a gun shot, traffic estimation, street illumination, environmental quality, etc. A key advantage of the sensing system 100 implementing virtual sensors 118 is to do all the processing and featurization at the sensor assembly 102 itself, thereby addressing many of the privacy concerns in a smart city environment and also reducing the data that needs to be transmitted at the scale of a city.

In one general aspect, therefore, the present invention is directed to a sensing system comprising a sensor assembly and a back-end server system. The sensor assembly comprises a control circuit and one or more sensors, where each of the sensors is configured to sense one or more physical phenomena in an environment of the sensor assembly that are indicative of events. The back end server system comprises at least one server that is in communication with the sensor assembly. The control circuit of the sensor assembly is configured to extract a plurality of features from raw sensor data collected by the one or more sensors to form featurized data and to transmit data packets to the back end server system, where the data packets comprise the featurized data. The at least one server of the back end server system is configured to implement one or more first order virtual sensors, where each of the one or more first order virtual sensors is trained through machine learning to detect, based on the featurized data, an event in the environment of the sensor assembly.

In another general aspect, the back end server system comprises at least one server that comprises a processor and a memory for storing instructions that, when executed by the processor, cause the server to: (i) receive the featurized data from the sensor assembly; (ii) determine an occurrence of one or more events via the featurized data; (iii) train, via machine learning, one or more first order virtual sensor implemented by the server to detect the one or more events based on the featurized data; and (iv) monitor, via the virtual sensor, for subsequent occurrences of the one or more events based on featurized data from the sensor assembly.

According to various implementations, the events detected by the one or more first order virtual sensors are not directly sensed by any of the one or more sensors of the sensor assembly. Also, the sensor assembly may be in wireless communication with the back end server system.

Additionally, the at least one server of the back end server system may be further configured to implement one or more second order virtual sensors, wherein the one or more second order virtual sensors are trained to detect, based on, at least in part, outputs of one of more of the first order virtual sensors, a second order condition in the environment of the sensor assembly. At least one of the one or more second order virtual sensors may produce a non-binary output and the first order virtual sensors may produce binary outputs, non-binary outputs, or a set of labels. For example, the first, second and/or higher order virtual sensors may comprise machine-learned classifiers that are trained to detect events, conditions, durations, etc. in the environment of the sensor assembly. The classifiers could be support vector machines or deep learning algorithms/networks, for example, that may be trained through supervised or unsupervised learning. Labeled data for supervised learning may be collected from annotations of events by a user that are captured via a user interface provided by the back end server system.

The sensors may comprise passive and/or active sensors. Examples of passive sensors are an infrared radiation sensor, an ambient light color sensor, an ambient light intensity sensor, a magnetic field sensor, a temperature sensor, an ambient pressure sensor, a humidity sensor, a vibration sensor, an external device communication sensor, a motion sensor, an acoustic sensor, an indoor air quality sensor, a chemical sensor, a vision sensor, and an electromagnetic interference sensor. Examples of active sensors are a sonar sensor, an ultrasonic sensor, a light emitting sensor, a radar based sensor, an acoustic sensor, an infrared camera, an active infrared sensor, an indoor positioning system, an x-ray based sensor, a seismic sensor, and an active sound measurement system. The sensor assembly may also comprise an output feedback device, such as a speaker, a light source, and a vibration source. Additionally, the sensor assembly may be positionally stationary. And it need not include a high-resolution camera.

In various implementations, the back-end server system is configured to transmit a notification to the sensor assembly when a particular event is detected by the one or more first order virtual sensors. In turn, the sensor assembly may transmit a notification to a user via the output feedback device in response to receiving the notification from the back end server system that the particular event was detected.

In various implementations, the sensor assembly comprises one or more circuit boards, where the control circuit and the one or more sensors are connected to the one or more circuit boards. The sensor assembly may further comprise a housing that houses the one or more circuit boards, the one or more sensors, and the control circuit. In particular, the sensor assembly may comprise a single circuit board and a housing. The control circuit and the or more sensors may be connected to the single circuit board and the housing may house the single circuit board, the one or more sensors, and the control circuit.

In yet other implementations, a first sensor of the one or more sensors may have an adjustable sampling rate. In such an embodiment, the at least one server of the back end server system may be further configured to transmit an adjustment for the adjustable sampling rate for the first sensor to the sensor assembly.

Additionally, the featurized data for a sensor of the sensor assembly may comprise a statistical measure of raw sensor data for the sensor over a time window. The statistical measure may include; the minimum value over the time window; the maximum value over the time window; the range over the time window; the mean over the time window; the median over the time window; the mode over the time window; the sum of the raw sensor values over the time window; the standard deviation over the time window; and/or the centroid of the raw sensor values over the time window.

Furthermore, the control circuit of the sensor assembly may be configured to transmit periodic data packets to the back end server system, where the data packets comprise concatenated featurized data for two or more sensors of the plurality of sensors. The data packets may also be encrypted by the sensor assembly prior to being transmitted.

In various implementations, the sensor assembly further comprises a wireless communication circuit for communicating wirelessly with a user device. The wireless communication circuit may comprises a wireless communication circuit selected from the group consisting of a Bluetooth circuit, a WiFi circuit, a Z-Wave circuit, a Zigbee circuit, a RFID circuit, a LoRA radio circuit and a LoRAWAN radio circuit. Additionally, the back-end server system may be configured to transmit a notification to the sensor assembly when a particular event is detected by the one or more first order virtual sensors. In turn, the sensor assembly is configured to transmit a notification to the user device via the wireless communication circuit in response to receiving the notification from the back end server system that the event was detected. Also, the back-end server system may be configured to transmit a notification to a remote computer-based system when a particular condition is detected by a first, second or higher order virtual sensor.

In another general aspect, the sensing system may include a plurality of such sensor assemblies that are distributed throughout an environment or location. In such an embodiment, the first, second, and/or higher order virtual sensors may use data from sensors on more than one of the sensor assemblies to detect their corresponding events, conditions, durations, etc. that they are trained to detect throughout the environment or location.

In another general aspect, the present invention is directed to a method that comprises the steps of (i) sensing, by a sensor assembly that comprises one or more sensors, one or more physical phenomena in an environment of the sensor assembly; (ii) extracting a plurality of features from raw sensor data collected by the one or more sensors to form featurized data; and (iii) detecting, by a machine-learning first order virtual sensor of a back end server system, based on the featurized data, an event in the environment of the sensor assembly.

In various implementations, the sensor assembly extracts the plurality of features from the raw sensor data and the method further comprises the step of transmitting, by the sensor assembly, the featurized data to the back end server system. The method may also comprise the step of, prior to detecting the event, training the first order virtual sensor to detect the event from featurized data. The method may also comprise the step of receiving, by the back end server system via a user interface, annotations of occurrences of the event to use as the labeled data for the supervised training. In various embodiments, the back end server system comprises a plurality of machine-learning first order virtual sensors, and the detecting step comprises detecting, by each of the plurality of machine-learning first order virtual sensors, based on the featurized data, a different event in the environment of the sensor assembly. Also, the back end server system may further comprise a machine-learning second order virtual sensor that is trained through machine learning to detect, based on output from at least one of the plurality of first order virtual sensors, a second order condition in the environment of the sensor assembly, in which case the method may further comprise the step of detecting, by the machine-learning second order virtual sensor, the second order condition in the environment of the sensor assembly based on the output from at least one of the plurality of first order virtual sensors. In various implementations, one of the sensors has an adjustable sampling rate, in which case the method may further comprises the step of transmitting, by the back end server system, an adjustment for the sampling rate to the first sensor.

In various implementations, the sensor assembly further comprises an output feedback device. In such an embodiment, the method may further comprise the step of outputting, by the output feedback device, a code for authentication of the sensor assembly to a user device. Also, the sensor assembly may further comprise a wireless communication circuit for communicating wirelessly with a user device. In such an embodiment, the method may further comprise the steps of (i) transmitting, by the back-end server system, a notification to the sensor assembly when the event is detected by the first order virtual sensor; and (ii) transmitting, by the sensor assembly, a notification to the user device via the wireless communication circuit in response to receiving the notification from the back end server system that the event was detected.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution. For example, the various virtual sensors 118, 120, 124 described herein may be implemented with software stored in primary and/or secondary memory of the computer system 104, that when executed by a processor(s) of the computer system, causes the processor(s) to perform virtual sensor classifications as described herein. Similarly, the activation group and machine learning modules 116 (see FIG. 1) may be implemented with software stored in primary or secondary memory of the computer system 104, that when executed by a processor(s) of the computer system, causes the processor(s) to perform their respective functions as described herein.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program, which at least partially carries out processes and/or devices described herein, or a microprocessor configured by a computer program, which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module," and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent, publication, or other disclosure material, in whole or in part, that is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A sensing system comprising:
a sensor assembly comprising:
one or more circuit boards;
a control circuit connected to the one or more circuit boards; and
a collection of sensors, at least two of which are heterogeneous, in communication with the control circuit, wherein:
each of the sensors in the collection of sensors is coupled to one or more of the one or more circuit boards such that the each of the sensors in the collection of sensors is configured to sense one or more physical phenomena in an environment of the sensor assembly; and
a back end server system, comprising at least one server, that is in communication with the sensor assembly, wherein:
the control circuit of the sensor assembly is configured to:
extract a plurality of features from raw sensor data collected by the collection of sensors to form featurized data; and
transmit the featurized data to the back end server system; and
the at least one server of the back end server system is configured to:
determine one or more selected sensors of the collection of sensors whose featurized data are correlated with an event occurring in the environment of the sensor assembly;
generate a first order virtual sensor by training a machine learning model to detect the event based on the featurized data from the one or more selected sensors; and
detect the event using the trained first order virtual sensor and featurized data from the one or more selected sensors.

2. The sensing system of claim 1, wherein the event detected by the first order virtual sensor is not directly sensed by any of the sensors in the collection of sensors of the sensor assembly.

3. The sensing system claim 1, wherein the at least one server of the back end server system is further configured to generate a second order virtual sensor to detect, based on, at least in part, outputs of the first order virtual sensor, a second order condition in the environment of the sensor assembly.

4. The sensing system of claim 3, wherein the back end server system is configured to transmit a notification to a remote computer-based system when a particular condition is detected by the second order virtual sensor.

5. The sensing system claim 3, wherein the second order virtual sensor is a trained machine learning model.

6. The sensing system of claim 1, wherein the collection of sensors comprise at least one passive sensor selected from the group consisting of an infrared radiation sensor, an ambient light color sensor, an ambient light intensity sensor, a magnetic field sensor, a temperature sensor, an ambient pressure sensor, a humidity sensor, a vibration sensor, an external device communication sensor, a motion sensor, an acoustic sensor, an indoor air quality sensor, a chemical sensor, a vision sensor, and an electromagnetic interference sensor.

7. The sensing system of claim 6, wherein:
the sensor assembly is in communicating with a user device;
the back end server system is configured to transmit a notification to the sensor assembly when a particular event is detected by the first order virtual sensor; and the sensor assembly is configured to transmit a notification to the user device in response to receiving the notification from the back end server system that the particular event was detected.

8. The sensing system of claim 1, wherein the collection of sensors comprise at least one active sensor selected from the group consisting of a sonar sensor, an ultrasonic sensor, a light emitting sensor, a radar based sensor, an acoustic sensor, an infrared camera, an active infrared sensor, an indoor positioning system, an x-ray based sensor, a seismic sensor, and an active sound measurement system.

9. The sensing system of claim 1, wherein:
the sensing system further comprises an output feedback device selected from the group consisting of a speaker, a light source, and a vibration source;
the back end server system is configured to transmit a notification to the sensor assembly when a particular event is detected by the first order virtual sensor; and
the sensor assembly is configured to transmit a notification to a user via the output feedback device in response to receiving the notification from the back end server system that the particular event was detected.

10. The sensing system of claim 1, wherein the first order virtual sensor comprises a classifier that is trained to detect the event in the environment of the sensor assembly.

11. The sensing system of claim 10, wherein the classifier is trained using at least one of supervised learning or unsupervised learning.

12. The sensing system of claim 1, wherein:
the sensor assembly comprises a housing;
the collection of sensors are connected to the one or more circuit boards; and
the housing houses the one or more circuit boards, the collection of sensors, and the control circuit.

13. The sensing system of claim 1, wherein the first order virtual sensor produces outputs are selected from the group consisting of a binary output, a non-binary output, and a set of labels.

14. The sensing system of claim 1, wherein:
the sensor assembly is one of a plurality of sensor assemblies distributed throughout a location, wherein each of the plurality of sensor assemblies is in communication with the back end server system;
each of the plurality of sensor assemblies comprises:
a control circuit; and
a collection of sensors, at least two of which are heterogeneous, connected to the control circuit, wherein each of the sensors in the collection of sensors is configured to sense one or more physical phenomena in a local environment of the sensor assembly, wherein the control circuit of the sensor assembly is configured to:
extract a plurality of features from raw sensor data collected by the collection of sensors to form featurized data; and
transmit the featurized data to the back end server system; and
the first order virtual sensor is trained through machine learning to detect, based on the featurized data transmitted from the plurality of sensor assemblies, the event in the location.

15. The sensing system of claim 1, wherein the at least one server of the back end server system is configured to transmit to the sensor assembly an instruction for which features to extract for at least one of the sensors in the collection of sensors.

16. The sensing system of claim 1, wherein the at least one server of the back end server system is configured to identify at least one of the sensors in the collection of sensors that has been activated based on the event in the environment of the sensor assembly.

17. A sensing system comprising:
a sensor assembly comprising:
one or more circuit boards;
a control circuit connected to the one or more circuit boards; and
a collection of sensors, at least two of which are heterogeneous, connected to the control circuit, wherein:
each of the sensors in the collection of sensors is coupled to one or more of the one or more circuit boards such that each of the sensors in the collection of sensors senses one or more physical phenomena in an environment of the sensor assembly that are indicative of events; and
the control circuit is configured to featurize raw sensor data from the collection of sensors to generate featurized data; and
a back end server system, comprising at least one server in communication with the sensor assembly, wherein the at least one server comprises:
a processor; and
a memory storing instructions that, when executed by the processor, cause the at least one server to:
receive the featurized data from the sensor assembly;
determine one or more selected sensors of the collection of sensors whose featurized data are correlated with an event occurring in the environment of the sensor assembly;
train, via machine learning, a first order virtual sensor to detect the event based on the featurized data from the one or more selected sensors; and
monitor, via the trained first order virtual sensor, for subsequent occurrences of the event based on featurized data from the one or more selected sensors.

18. The sensing system of claim 17, wherein the at least one server of the back end server system is further configured to generate a second order virtual sensor to detect, based on, at least in part, outputs of the first order virtual sensor, a second order condition in the environment of the sensor assembly.

19. The sensing system of claim 18, wherein the back end server system is configured to transmit a notification to a remote computer-based system when a particular condition is detected by the second order virtual sensor.

20. A method comprising:
sensing, by a sensor assembly that comprises a collection of sensors, at least two of which are heterogeneous, coupled to one or more circuit boards, one or more physical phenomena in an environment of the sensor assembly;
extracting a plurality of features from raw sensor data collected by the collection of sensors to form featurized data;
determining one or more selected sensors of the collection of sensors whose featurized data are correlated with an event occurring in the environment of the sensor assembly;
generating, by a back end server system communicably connected to the sensor assembly, a first order virtual sensor by training a machine learning model to detect the event based on the featurized data from the one or more selected sensors; and detecting, by the trained first order virtual sensor, based on the featurized data from the one or more selected sensors, the event in the environment of the sensor assembly.

21. The method of claim 20, wherein:
the sensor assembly extracts the plurality of features from the raw sensor data; and
the method further comprises the step of transmitting, by the sensor assembly, the featurized data to the back end server system that comprises at least one server.

22. The method of claim 21, wherein:
generating the first order virtual sensor comprises training the machine learning model through supervised training with labeled data; and
the method further comprises the step of receiving, by the back end server system, via an user interface, annotations of occurrences of the event to use as the labeled data for the supervised training.

23. The method of claim 21, wherein generating the first order virtual sensor comprises training the machine learning model through unsupervised learning using a deep learning algorithm.

24. The method of claim 21, wherein:
the back end server system comprises:
  a plurality of machine-learning first order virtual sensors; and
  a machine-learning second order virtual sensor that is trained through machine learning to detect, based on output from at least one of the plurality of machine-learning first order virtual sensors, a second order condition in the environment of the sensor assembly;
the detecting step comprises detecting, by each of the plurality of machine-learning first order virtual sensors, based on the featurized data, a different event in the environment of the sensor assembly; and
the method further comprises the step of detecting, by the machine-learning second order virtual sensor, the second order condition in the environment of the sensor assembly based on the output from at least one of the plurality of first order virtual sensors.

25. The method of claim 24, further comprising transmitting, from the back end server system, a notification to a remote computer-based system when a particular condition is detected by the second order virtual sensor.

26. The method of claim 21, wherein transmitting the featurized data comprises transmitting by the sensor assembly, periodic, encrypted data packets that comprise the concatenated featurized data for two or more sensors to the back end server system.

27. The method of claim 20, wherein:
a first sensor of the one or more sensors comprises an adjustable sampling rate; and
the method further comprises the step of transmitting, by the back end server system, an adjustment for the sampling rate to the first sensor.

28. The method of claim 20, wherein:
the sensor assembly further comprises an output feedback device; and
the method further comprises the step of outputting, by the output feedback device, a code for authentication of the sensor assembly to a user device.

29. The method of claim 20, wherein extracting the plurality of features from the raw sensor data comprises computing, for at least one of the sensors in the collection of sensors, a statistical measure of raw sensor data for the sensor over a time window.

30. The method of claim 20, wherein extracting the plurality of features from the raw sensor data comprises transforming, for at least one of the sensors in the collection of sensors, the raw sensor data to a spectral representation.

* * * * *